US009293975B2

(12) United States Patent
Hino et al.

(10) Patent No.: US 9,293,975 B2
(45) Date of Patent: *Mar. 22, 2016

(54) ACTUATOR, OPTICAL SCANNER, AND IMAGE FORMING APPARATUS

(75) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 525 days.

This patent is subject to a terminal disclaimer.

(21) Appl. No.: 13/411,934

(22) Filed: Mar. 5, 2012

(65) Prior Publication Data
US 2012/0243066 A1 Sep. 27, 2012

(30) Foreign Application Priority Data

Mar. 24, 2011 (JP) ................................. 2011-066803

(51) Int. Cl.
G02B 26/08 (2006.01)
H02K 33/16 (2006.01)

(52) U.S. Cl.
CPC .............. H02K 33/16 (2013.01); G02B 26/085 (2013.01)

(58) Field of Classification Search
CPC ............ G02B 26/085; G02B 26/0841; G02B 26/0858; G02B 26/0833; G02B 7/1821
USPC ...................... 359/198.1–199.4, 200.6–200.8, 359/213.1–215.1, 224.1–224.2; 310/36, 38, 310/309, 311
See application file for complete search history.

(56) References Cited

U.S. PATENT DOCUMENTS

| 5,226,321 | A  | * | 7/1993  | Varnham et al. ............ 73/514.02 |
| 7,061,063 | B2 | * | 6/2006  | Kato et al. ..................... 257/417 |
| 7,582,219 | B1 |   | 9/2009  | Asai et al. |
| 7,926,369 | B2 |   | 4/2011  | Yoda |
| 8,614,831 | B2 | * | 12/2013 | Hino et al. .................. 358/3.08 |
| 2003/0016428 | A1 | | 1/2003 | Kato et al. |
| 2005/0179951 | A1 | | 8/2005 | Urakawa |
| 2005/0185240 | A1 | | 8/2005 | Kato et al. |
| 2009/0161189 | A1 | | 6/2009 | Noguchi et al. |
| 2009/0231653 | A1 | | 9/2009 | Nakamura et al. |
| 2011/0102870 | A1 | | 5/2011 | Nakamura et al. |

FOREIGN PATENT DOCUMENTS

| JP | 2003-131161 A | 5/2003 |
| JP | 2005-345837 | 12/2005 |
| JP | 2009-069675 | 4/2009 |
| JP | 2009-089501 A | 4/2009 |
| JP | 2009-148847 | 7/2009 |
| JP | 2009-294458 | 12/2009 |
| JP | 2010-079243 | 4/2010 |
| JP | 2011-107675 A | 6/2011 |
| JP | 2011-170370 A | 9/2011 |

* cited by examiner

Primary Examiner — James Phan
(74) Attorney, Agent, or Firm — Harness, Dickey & Pierce, P.L.C.

(57) ABSTRACT

An actuator includes: a movable portion that can oscillate around an oscillation axis; a connection portion that extends from the movable portion and is torsionally deformed in accordance with oscillation of the movable portion; and a support portion that supports the connection portion. The movable portion forms a cross shape in a plan view from a thickness direction of the movable portion.

14 Claims, 15 Drawing Sheets

US 9,293,975 B2

ACTUATOR, OPTICAL SCANNER, AND IMAGE FORMING APPARATUS

This application claims priority to Japanese Patent Application No. 2011-066803 filed Mar. 24, 2011 which is hereby expressly incorporated by reference herein in its entirety.

BACKGROUND

1. Technical Field

The present invention relates to an actuator, an optical scanner, and an image forming apparatus.

2. Related Art

Actuators that use torsional vibrators are known (for example, see JP-A-2010-79243).

For example, in JP-A-2010-79243, a light deflector is disclosed in which a movable plate (movable portion), a support frame (support portion), and one pair of elastic support portions (connection portions) that support the movable plate so as to be able to revolve torsionally (twist) with respect to the support frame are provided, and each elastic support portion is configured by two posts (beam members).

The movable plate, support frame, and one pair of the elastic support portions are integrally formed by performing anisotropic etching of a silicon substrate of which the principal face is configured by a plane (100) formed from silicon.

In addition, in the light deflector according to JP-A-2010-79243, the movable plate forms an octagon in a plan view. Thus, the movable plate has a decreased weight at a position located far from the revolving axis (oscillation axis), which advantageously decreases the moment of inertia.

However, in a case where the movable plate having an octagon shape in a plan view is manufactured through anisotropic etching as described above, there is a large variation in the shape due to the relation with crystal planes.

SUMMARY

An advantage of some aspects of the invention is that it provides an actuator, an optical scanner, and an image forming apparatus capable of decreasing the moment of inertia when oscillating the movable portion by decreasing the variation in the shape of the movable portion at the time of manufacturing.

An aspect of the invention is directed to an actuator including: a movable portion that can oscillate around an oscillation axis; a connection portion that extends from the movable portion and is torsionally deformed in accordance with oscillation of the movable portion; and a support portion that supports the connection portion. The movable portion forms a cross shape in a plan view from a thickness direction of the movable portion.

According to the above-described actuator, the variation in the shape of the movable portion can be decreased in the manufacturing process. Therefore, the moment of inertia at the time of oscillating the movable portion can be decreased.

In the above described actuator, it is preferable that an external shape of the movable portion in the plan view from the thickness direction is mainly configured by a segment that is parallel to the oscillation axis and a segment that is vertical to the oscillation axis.

In such a case, the variation in the shape of the movable portion in the manufacturing process can be decreased.

In the above described actuator, it is preferable that the movable portion, the support portion, and the connection portion are formed by performing anisotropic etching of a silicon substrate.

In such a case, the variation in the shape is decreased, and accordingly, the movable portion, support portion, and one pair of the connection portion can be easily formed.

In the above described actuator, it is preferable that a plate face of the movable portion is configured by a plane (100) of silicon.

Accordingly, by performing anisotropic etching for a silicon substrate of which the plate face is configured by a plane (100), the variation in the shape can be decreased, whereby the movable portion, support portion, and one pair of the connection portions can be easily formed.

In the above described actuator, it is preferable that a side face of the movable portion is mainly configured by a plane (111) of silicon.

Accordingly, by performing anisotropic etching for a silicon substrate of which the plate face is configured by a plane (100), the variation in the shape can be decreased by using the plane (111) of silicon as an etching stopping layer. Therefore, the movable portion, support portion, and one pair of the connection portions can be easily formed.

In the above described actuator, it is preferable that a groove that forms a "V" shape at a cross-section that is perpendicular to the plate face of the movable portion is formed on the side face of the movable portion.

Accordingly, the moment of inertia of the movable portion can be decreased. In addition, for such a groove, by performing anisotropic etching for a silicon substrate of which the plate face is configured by a plane (100), the variation in the shape can be decreased by using the plane (111) of silicon as an etching stopping layer. Therefore, the movable portion can be easily formed.

In the above described actuator, it is preferable that a surface of the connection portion is configured by a plane (100) of silicon and a plane (111).

Accordingly, by using the plane (111) of silicon as an etching stopping layer, the variation in the shape is decreased, whereby the connection portions can be easily formed.

In the above described actuator, it is preferable that the movable portion forms a shape that is symmetrical with respect to the oscillation axis of the movable portion in the plan view from the thickness direction.

Accordingly, the center of gravity of the movable portion is located on the oscillation axis of the movable portion, and the oscillation of the movable portion can be smooth.

In the above described actuator, it is preferable that the movable portion forms a shape that is symmetrical with respect to a segment that passes through the center of the movable portion in the plan view from the thickness direction and is vertical to the oscillation axis of the movable portion.

Accordingly, the design of the movable portion can be easily performed.

Another aspect of the invention is directed to an actuator including: a movable portion that can oscillate around an oscillation axis; a connection portion that extends from the movable portion and is torsionally deformed in accordance with oscillation of the movable portion; and a support portion that supports the connection portion. The movable portion forms a shape acquired by eliminating four corner portions, which are in rectangular shapes, of a rectangle in the plan view from a thickness direction of the movable portion.

According to the above-described actuator, the variation in the shape of the movable portion in the manufacturing process can be decreased, whereby the moment of inertia at the time of oscillating the movable portion can be decreased.

Still another aspect of the invention is directed to an optical scanner including: a movable portion that includes a light reflecting portion having light reflectivity and can oscillate around an oscillation axis; a connection portion that extends from the movable portion and is torsionally deformed in accordance with oscillation of the movable portion; and a support portion that supports the connection portion. The movable portion forms a cross shape in a plan view from a thickness direction of the movable portion.

According to the optical scanner configured as above, the variation in the shape of the movable portion can be decreased in the manufacturing process. Therefore, the moment of inertia at the time of oscillating the movable portion can be decreased.

Yet another aspect of the invention is directed to an optical scanner including: a movable portion that includes a light reflecting portion having light reflectivity and can oscillate around an oscillation axis; a connection portion that extends from the movable portion and is torsionally deformed in accordance with oscillation of the movable portion; and a support portion that supports the connection portion. The movable portion forms a shape acquired by eliminating four corner portions, which are in rectangular shapes, of a rectangle in the plan view from a thickness direction of the movable portion.

According to the optical scanner configured as above, the variation in the shape of the movable portion can be decreased in the manufacturing process. Therefore, the moment of inertia at the time of oscillating the movable portion can be decreased.

Still yet another aspect of the invention is directed to an image forming apparatus including: a light source that emits light; and an optical scanner that scans light emitted from the light source. The optical scanner includes: a movable portion that includes a light reflecting portion having light reflectivity and can oscillate around an oscillation axis; a connection portion that extends from the movable portion and is torsionally deformed in accordance with oscillation of the movable portion; and a support portion that supports the connection portion. The movable portion forms a cross shape in a plan view from a thickness direction of the movable portion.

According to the image forming apparatus configured as above, the variation in the shape of the movable portion can be decreased in the manufacturing process. Therefore, the moment of inertia at the time of oscillating the movable portion can be decreased. Accordingly, a high-quality image can be acquired at low cost.

Still yet another aspect of the invention is directed to an image forming apparatus including: a light source that emits light; and an optical scanner that scans light emitted from the light source. The optical scanner includes: a movable portion that includes a light reflecting portion having light reflectivity and can oscillate around an oscillation axis; a connection portion that extends from the movable portion and is torsionally deformed in accordance with oscillation of the movable portion; and a support portion that supports the connection portion. The movable portion forms a shape acquired by eliminating four corner portions, which are in rectangular shapes, of a rectangle in the plan view from a thickness direction of the movable portion.

According to the image forming apparatus configured as above, the variation in the shape of the movable portion can be decreased in the manufacturing process. Therefore, the moment of inertia at the time of oscillating the movable portion can be decreased. Accordingly, a high-quality image can be acquired at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, actuators, optical scanners, and image forming apparatuses according to preferred embodiments of the invention will be described with reference to the accompanying drawings. In the following, a case will be described as an example in which an actuator according to an embodiment of the invention is applied to an optical scanner.

First Embodiment

First, an optical scanner according to a first embodiment of the invention will be described.

Figure 1:
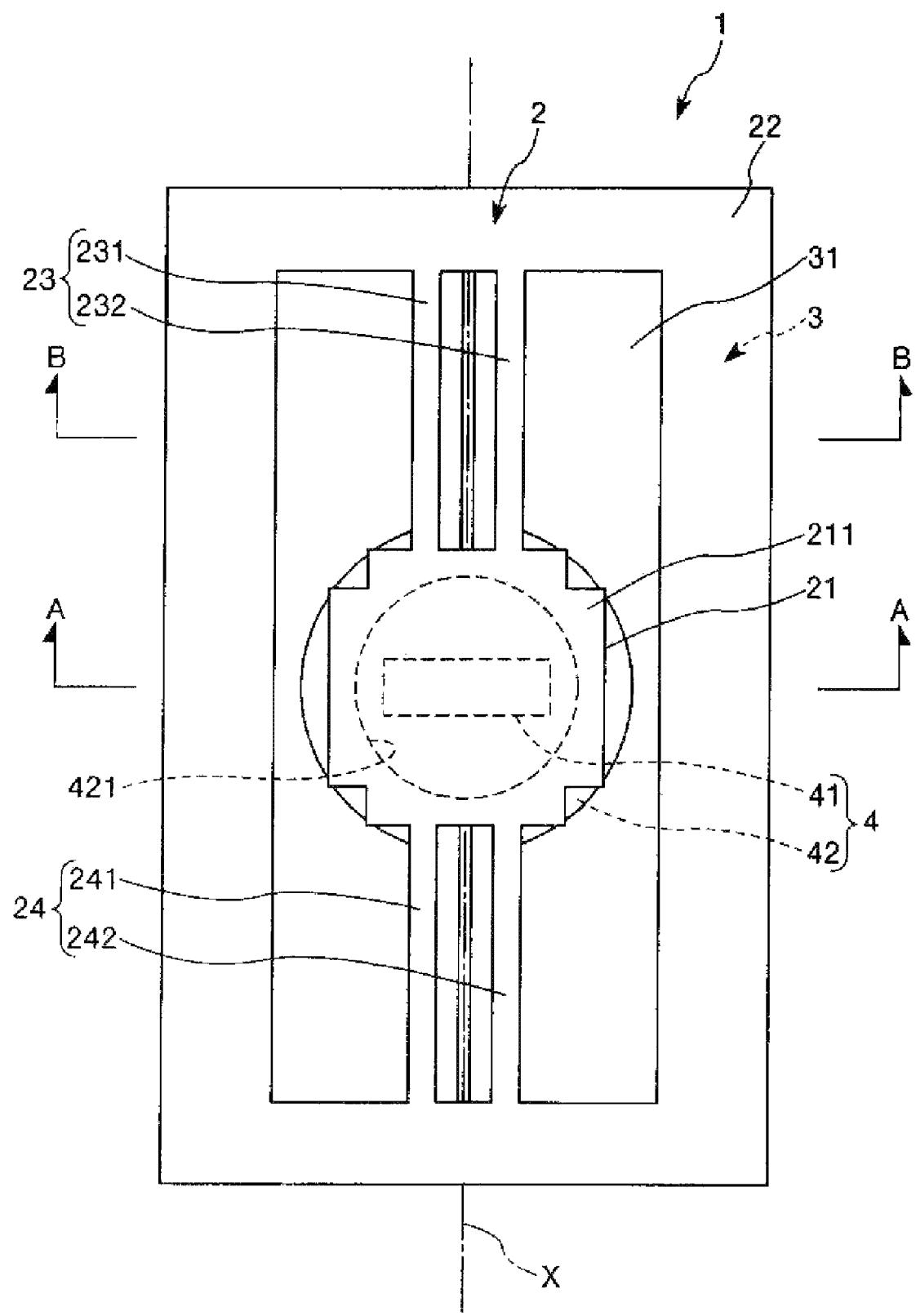
FIG. 1 is a plan view showing an optical scanner (actuator) according to a first embodiment of the invention.
Figure 2:
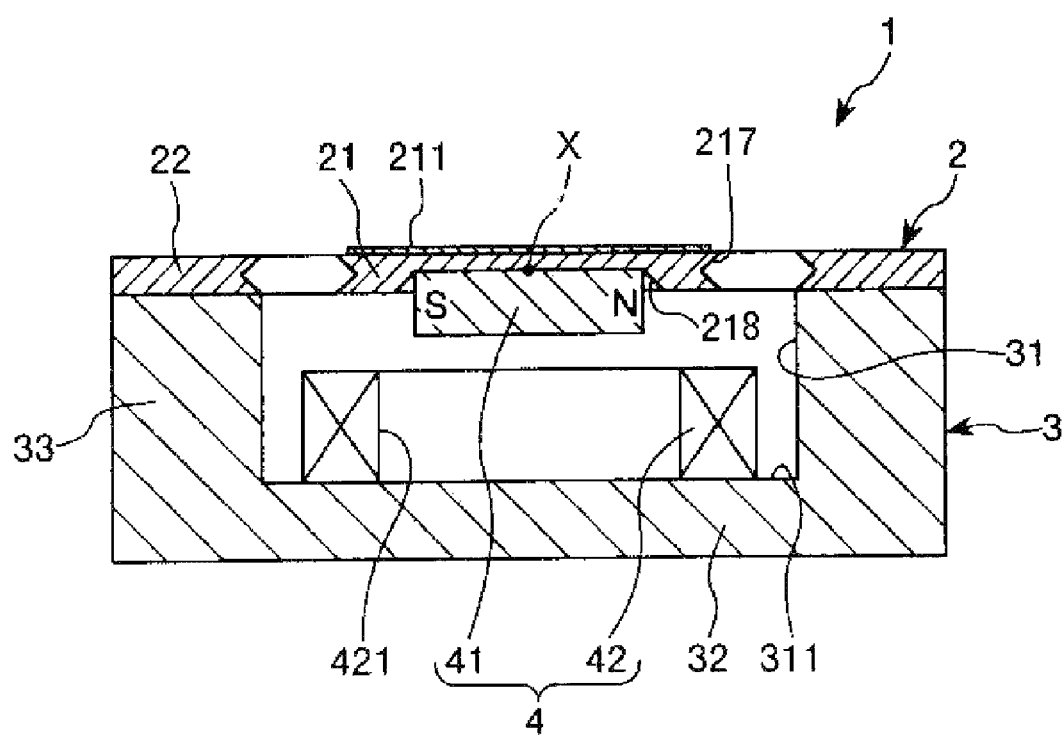
FIG. 2 is a cross-sectional view taken along line A-A shown in FIG. 1.
Figure 3:
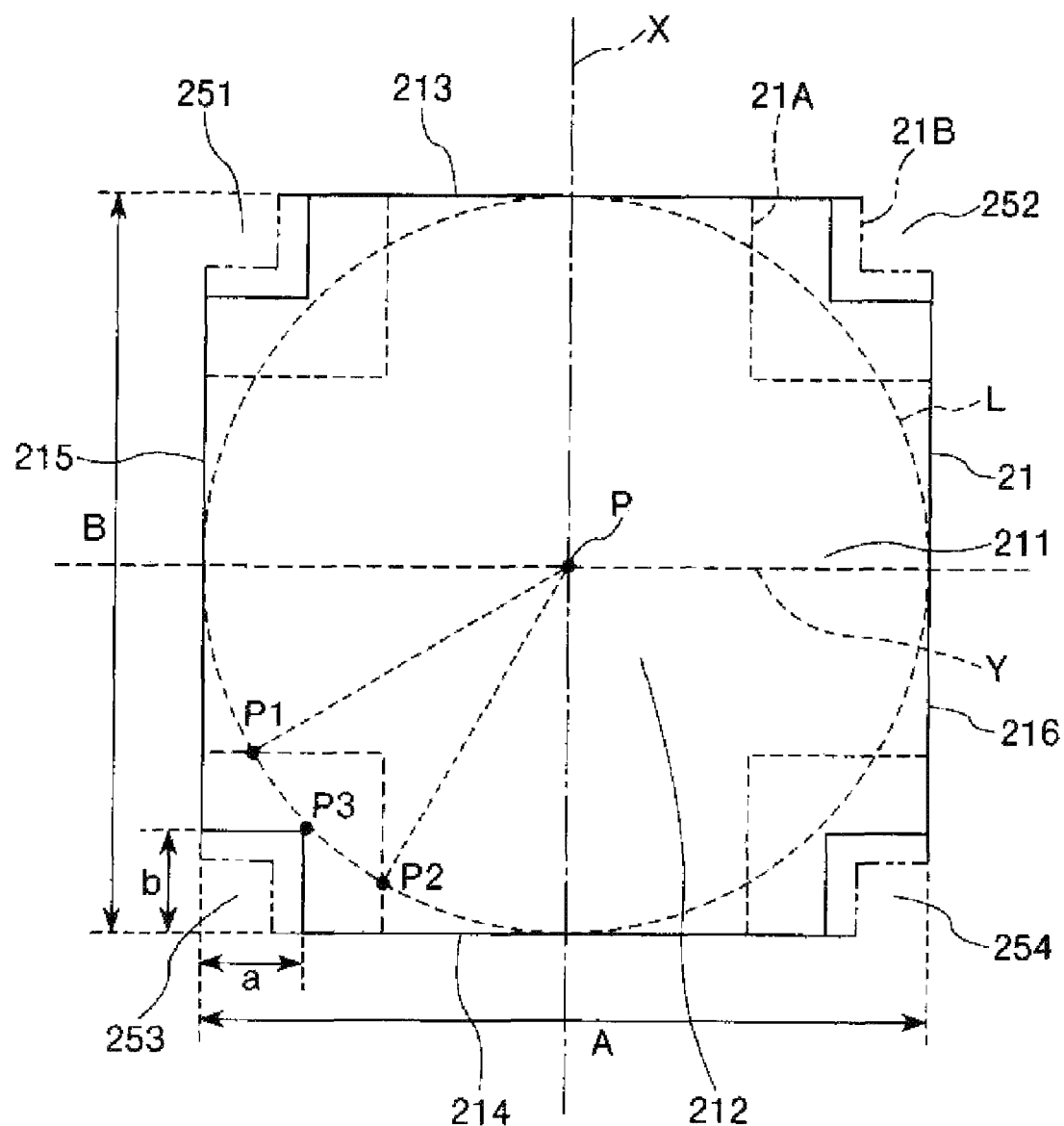
FIG. 3 is a plan view illustrating a movable plate that is included in the optical scanner shown in FIG. 1.
Figure 4:
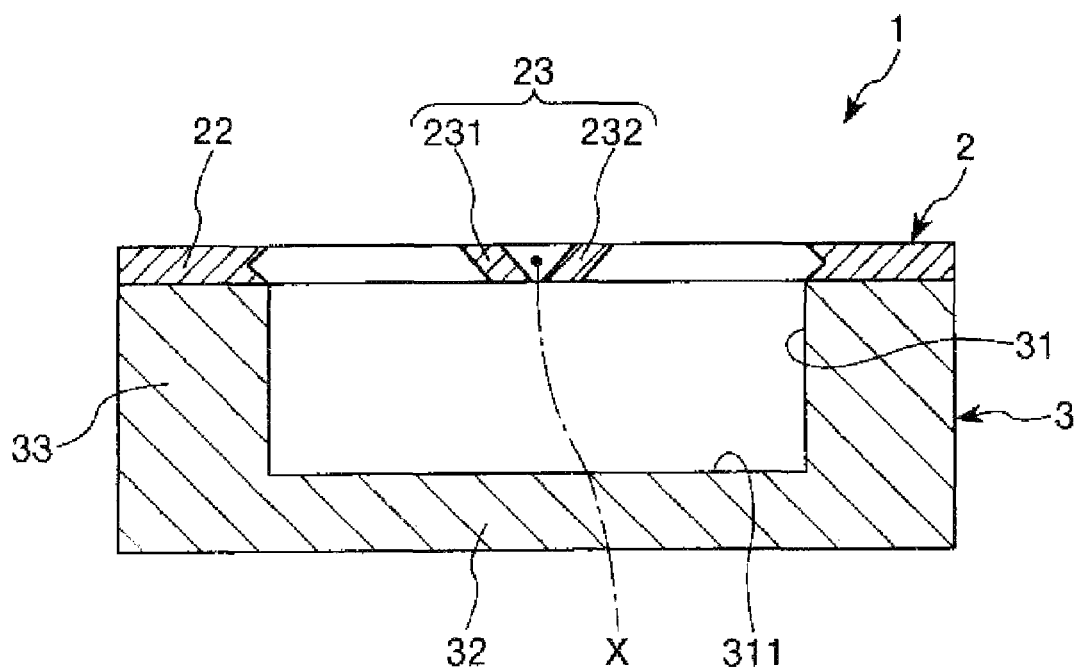
FIG. 4 is a cross-sectional view taken along line B-B shown in FIG. 1.
Figure 5:
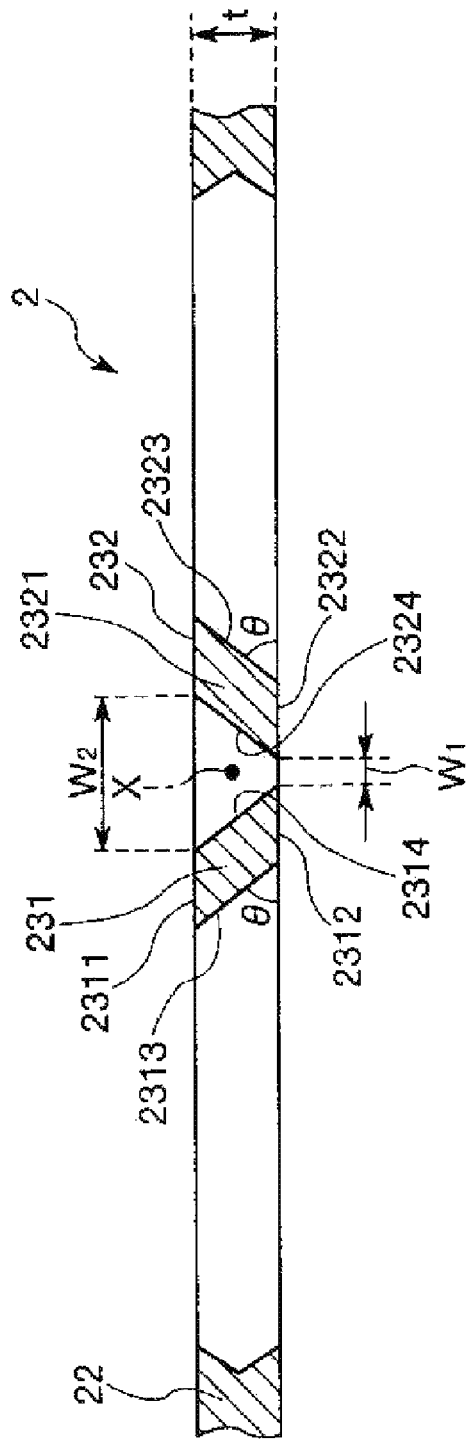
FIG. 5 is a partially enlarged cross-sectional view of the optical scanner shown in FIG. 4.

FIG. 1 is a plan view showing an optical scanner (actuator) according to a first embodiment of the invention. FIG. 2 is a cross-sectional view taken along line A-A shown in FIG. 1. FIG. 3 is a plan view illustrating a movable plate that is included in the optical scanner shown in FIG. 1. FIG. 4 is a cross-sectional view taken along line B-B shown in FIG. 1. FIG. 5 is a partially enlarged cross-sectional view of the optical scanner shown in FIG. 4. FIGS. 6A to 6G are cross-sectional views illustrating a method of manufacturing the optical scanner shown in FIG. 1. FIGS. 7A to 7G are cross-sectional views illustrating a method of manufacturing the optical scanner shown in FIG. 1. FIGS. 8A to 8G are cross-sectional views illustrating a method of manufacturing the optical scanner shown in FIG. 1. FIGS. 9A to 9D are diagrams illustrating the formation of a connection portion in an etching process shown in FIG. 8E. FIGS. 10A to 10D are diagrams illustrating the formation of a connection portion in an etching process shown in FIG. 8E (in a case where there is mask misalignment). Hereinafter, for convenience of the description, in FIGS. 2, 4 to 10D, the upper side is referred to as "up", and the lower side is referred to as "low".

As shown in FIG. 1, the optical scanner 1 includes: a base body 2 that has a vibration system; a support body 3 that supports the base body 2; and a driving unit 4 that vibrates the vibration system of the base body 2.

In addition, the base body 2 includes a movable plate (movable portion) 21 in which a light reflecting portion 211 is disposed, one pair of connection portions 23 and 24 that are connected to the movable plate 21, and a support portion 22 that supports the one pair of connection portions 23 and 24. The support portion 22 may be described as supporting the movable plate 21 through the connection portions 23 and 24, and the one pair of connection portions 23 and 24 may be described as connecting the movable plate 21 and the support portion 22.

In the optical scanner 1, depending on the driving force of the driving unit 4, while the connection portions 23 and 24 are torsionally deformed, the movable plate 21 is revolved (twisted) around a predetermined axis along the connection portions 23 and 24. Accordingly, light reflected by the light reflecting portion 211 can be scanned in one predetermined direction.

Hereinafter, portions that configure the optical scanner 1 will be sequentially described in detail.

Base Body

The base body 2, as described above, includes the movable plate 21 in which the light reflecting portion 211 is disposed, the support portion 22 that supports the movable plate 21, and the one pair of connection portions 23 and 24 that connect the movable plate 21 and the support portion 22.

The base body 2 is composed of silicon as its main material, and the movable plate 21, the support portion 22, and the connection portions 23 and 24 are integrally formed. More specifically, the base body 2, as will be described in detail later, is formed by performing anisotropic etching of a silicon substrate of which the plate face is configured by a plane (100) of silicon. By performing such anisotropic etching, the movable plate 21, the support portion 22, and the one pair of connection portions 23 and 24 can be formed in a simple manner with high precision by using the plane (111) of silicon as an etching stopping layer. Here, generally, as the silicon substrate, a monocrystalline silicon substrate is used.

In addition, the upper face and the lower face of the base body 2 are respectively configured by the plane (100) of silicon. In addition, the inner peripheral face of the support portion 22, the side face of the movable plate 21, and portions of side faces of the connection portions 23 and 24 that are parallel to the axial line X are respectively configured by a plane (111) of silicon.

Furthermore, the silicon is light-weight and has a rigidity to the level of SUS. Thus, by composing the base body 2 with silicon as its main material, the base body 2 has excellent vibration characteristics. In addition, silicon can be processed with high dimensional precision. Thus, by forming the base body 2 using a silicon substrate, the base body 2 has a desired shape (desired vibration characteristics).

Hereinafter, the base body 2 will be described in more detail.

The support portion 22, as shown in FIG. 1, has a frame shape. More specifically, the support portion 22 forms a square ring shape. The support portion 22 supports the movable plate 21 through one pair of the connection portions 23 and 24. The shape of the support portion 22 is not particularly limited as long as it can support the movable plate 21 through the one pair of connection portions 23 and 24. Thus, for example, the support portion 22 may have a shape that is divided in correspondence with the connection portions 23 and 24.

The movable plate 21 is disposed on the inner side of the support portion 22.

The movable plate 21 forms a plate shape. In this embodiment, the movable plate 21 has a shape (a cross shape) acquired by removing four corners from a rectangle (in this embodiment, a square) in the plan view from the direction of the plate thickness of the movable plate 21. Accordingly, while the area (light reflecting area) of the light reflecting portion 211 disposed on the upper face of the movable plate 21 is sufficiently acquired, the moment of inertia at the time of revolving the movable plate 21 can be decreased. In addition, as will be described in detail later, by performing anisotropic etching of a silicon substrate, the movable plate 21 can be formed with high precision in a simple manner.

More specifically, as shown in FIG. 3, the movable plate 21 is configured by a main body portion 212, one pair of protrusions 213 and 214 that protrude from the main body portion 212 to both sides in a direction parallel to the axial line X, and one pair of protrusions 215 and 216 that protrude from the main body portion 212 to both sides in a direction (a direction parallel to a segment Y) perpendicular to the axial line X. Accordingly, the movable plate 21 forms a cross shape in the plan view from the plate thickness direction.

In addition, between the protrusion 213 and the protrusion 215 in a direction extending along the outer periphery of the movable plate 21, a deficient portion 251 is formed. Between the protrusion 213 and the protrusion 216 in the direction extending along the outer periphery of the movable plate 21, a deficient portion 252 is formed. In addition, between the protrusion 214 and the protrusion 216 in the direction extending along the outer periphery of the movable plate 21, a deficient portion 254 is formed. Between the protrusion 214 and the protrusion 215 in the direction extending along the outer periphery of the movable plate 21, a deficient portion 253 is formed.

In other words, in the plan view from the plate thickness direction of the movable plate 21, along the outer periphery of the movable plate 21, the deficient portion 251, the protrusion 213, the deficient portion 252, the protrusion 216, the deficient portion 254, the protrusion 214, the deficient portion 252, and the protrusion 215 are disposed so as to be arranged in this order.

In addition, the deficient portion 251 and the deficient portion 252 face each other through the protrusion 213. The deficient portion 252 and the deficient portion 254 face each other through the protrusion 216. In addition, the deficient portion 253 and the deficient portion 254 face each other through the protrusion 214. The deficient portion 251 and the deficient portion 253 face each other through the protrusion 215.

Each one of the protrusions 213 to 216 and the deficient portions 251 to 254 forms a rectangle in the plan view from the plate thickness direction of the movable plate 21. In FIGS. 1 and 3, the plan view of each one of the deficient portions 251 to 254 forms a square. In each corner of the external cross shape of the movable plate 21, a plurality of crystal planes appear instead of a predetermined crystal plane. Accordingly, each corner portion does not form a right angle, and each one of the deficient portions 251 to 254 is not a precise rectangle. However, in this embodiment, it is assumed that each one of the deficient portions 251 to 254 is a rectangle that includes the above-described shape.

The external shape of the movable plate 21 in the plan view from the plate thickness direction is mainly configured by a segment that is parallel to the revolving center axis (the axial line X) of the movable plate 21 and a segment (segment Y) that is perpendicular to the revolving center axis (the axial line X) of the movable plate 21. Accordingly, as described later, by performing anisotropic etching of a silicon substrate, the movable plate 21 can be formed with high precision in an easy manner. In addition, on the corner of the external cross shape of the movable plate 21, a plurality of crystal planes appear instead of a predetermined crystal plane. Accordingly, the external shape of the corner portion in the plan view from the plate thickness direction of the movable plate 21 is not necessarily a segment that is parallel to the axial line X or the segment Y. In other words, the external shape of the movable plate 21 in the plan view from the plate thickness direction is configured by a segment parallel to the axial line X and a segment parallel to the segment Y except for the corners of the movable plate 21.

In addition, the movable plate 21 forms a shape that is symmetrical with respect to the revolving center axis (the axial line X) of the movable plate 21 in the plan view. Accordingly, the center of gravity of the movable plate 21 is positioned on the revolving center axial line of the movable plate 21, whereby the revolving of the movable plate 21 can be smooth.

Furthermore, the movable plate 21 has a shape that passes through the center P of the movable plate 21 in the plan view and is symmetrical with respect to the segment Y that is perpendicular to the revolving center axis (the axial line X) of the movable plate 21. Accordingly, the design of the movable plate can be performed in an easy manner.

In addition, the plate face of the movable plate 21 is configured by the plane (100) of silicon. Accordingly, as will be described later, by performing anisotropic etching of a silicon substrate of which the plate face is configured by a plane (100), the movable plate 21, the support portion 22, and the one pair of the connection portions 23 and 24 can be formed with high precision in a simple manner.

Furthermore, the side face of the movable plate 21 is mainly configured by the plane (111) of silicon. Accordingly, as will be described later, by performing anisotropic etching of a silicon of which the plate face is configured by a plane (100), the movable plate 21, support portion 22, and one pair of the connection portions 23 and 24 can be formed with high precision in a simple manner by using the plane (111) of silicon as an etching stopping layer. In addition, on the corners of the external shape in the plan view from the plate thickness direction of the movable plate 21, the side face of the movable plate 21 includes a crystal plane other than the plane (111). Accordingly, the side face of the movable plate 21 is configured by the plane (111) of silicon except for at least the side face on the corner.

In addition, a groove 217 of which the horizontal cross-section forms a "V" shape is formed on the side face of the movable plate 21. Accordingly, the moment of inertia of the movable plate 21 can be decreased. In addition, by performing anisotropic etching of a silicon substrate of which the plate face is configured by a plane (100), the groove can be formed with high precision in a simple manner by using the plane (111) of silicon as an etching stopping layer.

In addition, when the length of the movable plate 21 in a direction (hereinafter, also referred to as a "segment Y direction") vertical to the revolving center axis (axial line X) in the plan view from the direction of the plate thickness is A, the length of the movable plate 21 in a direction (hereinafter, also referred to as an "axial line X direction") parallel to the revolving center axis (the axial line X) is B, the length of each one of the deficient portions 251 to 254 in the segment Y direction is a, and the length of each one of the deficient portions 251 to 254 in the axial line X direction is b, the following Expressions (A) and (B) are satisfied.

$$0.8 \times \left\{\frac{1}{2}\left(A - \sqrt{\frac{1}{\frac{3}{A^2} + \frac{1}{B^2}}}\right)\right\} \leq a \leq 2.0 \times \left\{\frac{1}{2}\left(A - \sqrt{\frac{1}{\frac{1}{3A^2} + \frac{1}{B^2}}}\right)\right\} \quad (A)$$

$$0.8 \times \left\{\frac{1}{2}\left(B - \sqrt{\frac{1}{\frac{1}{3A^2} + \frac{1}{B^2}}}\right)\right\} \leq b \leq 2.0 \times \left\{\frac{1}{2}\left(B - \sqrt{\frac{1}{\frac{3}{A^2} + \frac{1}{B^2}}}\right)\right\} \quad (B)$$

By satisfying Expressions (A) and (B) described above, while the area of the light reflecting portion 211 of the movable plate 21, which is necessary for light reflection, is secured, the moment of inertia at the time of revolving the movable plate 21 can be efficiently decreased.

In contrast to this, in a case where the lengths a and b are less than the above-described lower limits, the effect of decreasing the moment of inertia at the time of revolving the movable plate 21 tends to be small. Accordingly, depending on the thickness of the movable plate 21, the movement based bending of the movable plate 21 increases, whereby there is a case where the optical characteristics of the optical scanner 1 deteriorate.

On the other hand, in a case where the lengths a and b exceed the above-described upper limits, the area of the light reflecting portion 211 of the movable plate 21 is not efficiently used, and the intensity of light reflected from the light reflecting portion 211 tends to be low.

In addition, in FIG. 3, the dotted lines denote a case where Expressions (A) and (B) described above are satisfied for a movable plate 21A where the lengths a and b are respectively a maximum, and a movable plate 21B where the lengths a and b are respectively a minimum.

Hereinafter, Expressions (A) and (B) will be briefly described.

As shown in FIG. 3, in a case where a spot of light L having a circular shape or an oval shape is inscribed in the movable plate 21 in the plan view, the area of each one of the deficient portions 251 to 254 is the maximum outside the spot of light L when $a=(1-1/\sqrt{2})\cdot A$ and $b=(1-1/\sqrt{2})\cdot B$.

In addition, in such a case, the length a is the maximum, and the length b is the minimum in a range in which the effect of the formation of the deficient portions 251 to 254 is acquired when the corner P3 of each one of the deficient portions 251 to 254 is located at an intersection P2 of a segment tilting with respect to the axial line X by 30° and the outer circumference of the spot of light L.

In addition, in such a case, the length a is the minimum, and the length b is the maximum in the range in which the effect of the formation of the deficient portions 251 to 254 is acquired when the corner P3 of each one of the deficient portions 251 to 254 is located at an intersection P1 of a segment tilting with respect to the axial line X by 60° and the outer circumference of the spot of light L.

Furthermore, generally, the effective range of the diameter of the spot of a laser beam that is commonly used as light L is regarded as a range in which the diameter is equal to or larger than $1/e^2$ of the peak luminance. Accordingly, in a case where the effective range is inside the light reflecting portion 211, ideal light reflection can be performed.

However, even in a case where the diameter of the spot of an actual laser beam is outside the above-described effective range, a small quantity of light is present therein. Thus, even in a case where the lengths a and b are a little bit larger or smaller than the above-described values, the laser beam is suitable for practical use.

More specifically, the allowed values of the lengths a and b acquired as described above can be set to be −20% or more and +200% or less.

As above, Expressions (A) and (B) described above can be acquired.

On the upper face of the movable plate 21, the light reflecting portion 211 having light reflectivity is disposed. On the other hand, on the lower face of the movable plate 21, a permanent magnet 41 of the driving unit 4 to be described later is disposed. In addition, the permanent magnet 41 will be described in detail in the description of the driving unit 4.

Each of the connection portions 23 and 24 forms a rectangular shape and is configured to be elastically deformed. In addition, the connection portion 23 and the connection portion 24 face each other through the movable plate 21. The connection portions 23 and 24 connect the movable plate 21 and the support portion 22 such that the movable plate 21 can revolve around the support portion 22. One pair of the connection portions 23 and 24 is disposed so as to have the same axis extending along the axial line X, and the movable plate 21 revolves (oscillates) with respect to the support portion 22 around the axial line X as its revolving center axis (oscillation axis).

In this embodiment, as shown in FIG. 1, the connection portion 23 is configured by one pair of beam members 231 and 232. Similarly, the connection portion 24 is configured by one pair of beam members 241 and 242. Hereinafter, the connection portion 23 will be representatively described. Since the connection portion 24 is similar to the connection portion 23, the description thereof will be omitted.

The beam members 231 and 232 are disposed along the axial line X and face each other through the axial line X. In addition, the shape of the horizontal cross-section of each one of the beam members 231 and 232 forms a parallelogram.

More specifically, the external shape of the horizontal cross-section of each one of the beam members 231 and 232 forms a parallelogram that is configured by one pair of sides disposed along the plane (100) of silicon and one pair of sides disposed along the plane (111) of silicon. In other words, in the beam member 231, the upper face 2311 and the lower face 2312 are configured by the planes (100) of silicon, and one pair of side faces 2313 and 2314 are configured by the planes (111) of silicon. Similarly, in the beam member 232, the upper face 2321 and the lower face 2322 are configured by the planes (100) of silicon, and one pair of side faces 2323 and 2324 are configured by the planes (111) of silicon. Here, since the side faces 2313, 2324, 2323, and 2324 are configured by the planes (111) of silicon, the tilt angle θ with respect to the upper face or the lower face (that is, the plane (100) of silicon) of the base body 2 is 54.73°. Each one of the beam members 231 and 232 that configures the shape of the horizontal cross-section can be reliably formed by performing anisotropic etching of a silicon substrate of which the plate face is configured by the plane (100) of silicon.

In a case where the outer surface of the connection portion 23 is configured by the plane (100) of silicon and the plane (111) of silicon, the connection portion 23 can be formed with high precision in a simple manner by using the plane (111) of silicon as an etching stopping layer, which will be described later.

In addition, the beam members 231 and 232, when viewed from a direction parallel to the axial line X (in other words, viewed at the cross-section shown in FIG. 5), respectively have a shape symmetrical to a segment that vertically extends and passes through the axial line X.

In addition, in the cross-section shown in FIG. 5, the entire width (a distance between the side face 2313 of the beam member 231 and the side face 2323 of the beam member 232) of the connection portion 23 is increased from the lower side toward the upper side. In the cross-section shown in FIG. 5, a distance (the width of a gap) between the beam member 231 and the beam member 232 is increased from the lower side toward the upper side.

In other words, the distance between one pair of the beam members 231 and 232, when viewed from a direction parallel to the revolving center axis of the movable plate 21, is gradually increased from one face side of the movable plate 21 toward the other face side (in this embodiment, from the lower side toward the upper side).

When a distance between lower-side corners of the one pair of the beam members 231 and 232 is $W_1$, and the thickness t of one pair of the beam members 231 and 232 in the thickness direction of the movable plate 21 is t, the following Expression (1) is satisfied.

$$w_1 < \frac{t}{\tan 54.73°} \quad (1)$$

As will be described in detail later, since anisotropic etching is performed for a silicon substrate of which the plate face is configured by the plane (100) of silicon from both face sides thereof, there is case where formation positions of masks formed on both faces of the silicon substrate are misaligned when the movable plate 21, the support portion 22, and one pair of the connection portions 23 and 24 are formed. When the formation positions of masks on both faces of the silicon substrate are misaligned, level differences are generated on one pair of the side faces 2313 and 2314 or 2323 and 2324 of each one of the beam members 231 and 232 to be configured by the planes (111) of silicon. By satisfying Expression (1) described above, in a case where the formation positions of the masks formed on both faces of the silicon substrate are misaligned, a level difference formed on one side face and a level difference formed on the other face can be shifted in the thickness direction of the silicon substrate (see FIGS. 10A to 10D). Accordingly, the concentration of stress generated in the beam members 231 and 232 at the time of revolving the movable plate 21 can be alleviated.

As above, the optical scanner 1 can prevent damage due to the stress concentration at the time of driving in a relatively simple manner.

In addition, when a distance between upper-side corners of the one pair of the beam members 231 and 232 is $W_2$, the following Expression (2) is satisfied.

$$t < \frac{\tan 54.73°}{2}(w_1 + w_2) \quad (2)$$

Accordingly, by performing anisotropic etching of a silicon substrate of which the plate face is configured by the plane (100) of silicon from both face sides thereof, the connection portion 23 that is configured by the one pair of the beam members 231 and 232 can be reliably formed in a simple manner.

Support Body

The support body 3 has a function of supporting the above-described base body 2. In addition, the support body 3 has a function of supporting a coil 42 of the driving unit 4 to be described later.

This support body 3 forms a box shape having a concave portion 31 that is open on the upper side. In other words, the support body 3 is configured by a plate shape portion 32 forming a plate shape and a frame shape portion 33, which forms a frame shape, disposed along the outer periphery portion of the upper face of the plate shape portion 32.

The lower face of the support portion 22 of the base body 2 is bonded to a portion of the upper face of the support body 3 that is located outside the concave portion 31, that is, the upper face of the frame shape portion 33. Accordingly, between the movable plate 21 of the base body 2 and one pair of the connection portions 23 and 24 and the support body 3, a space used for allowing the movable plate 21 to revolve is formed.

The material configuring the support body 3 is not particularly limited. As examples of the above-described material, there are a glass material such as quartz glass, Pyrex glass ("Pyrex" is a registered trademark), or Tempex glass, a silicon material such as monocrystalline silicon or polysilicon, LTCC (Low Temperature Co-fired Ceramic), and the like.

The method of bonding the base body 2 and the support body 3 to each other may be appropriately determined in accordance with the composition material, the shape, and the like of the support body 3 and is not particularly limited. As examples of the bonding method, there are a method using an adhesive, an anodic bonding method, and a direct bonding method, and the like.

Driving Unit

The driving unit 4 includes the permanent magnet 41 and the coil 42 and drives the movable plate 21 of the base body 2 to revolve by using an electronic driving system (more particularly, an electronic driving system of a moving magnet type). The electronic driving system can generate a large driving force. Thus, according to the driving unit 4 that employs the electronic driving system, the deflection angle of the movable plate 21 can be increased while a low driving voltage is achieved.

The permanent magnet 41 is fixed to the lower face of the movable plate 21, for example, through an adhesive. In addition, the permanent magnet 41 forms a rectangular shape and is disposed so as to extend in a direction perpendicular to the axial line X in the plan view. The permanent magnet 41 is magnetized in the longitudinal direction, and one side thereof in the longitudinal direction is the south pole, and the other side thereof is the north pole. By disposing the permanent magnet 41 so as to extend in a direction perpendicular to the axial line X, both end portions of the permanent magnet 41 can be located far from the axial line X. Accordingly, a large torque can be given by the movable plate 21 based on the action of a magnetic field generated by the coil 42.

Such a permanent magnet 41 is not particularly limited. Thus, for example, a hard magnet such as a neodymium magnet, a ferrite magnet, a samarium-cobalt magnet, an alnico magnet, or a bond magnet that is magnetized can be appropriately used.

The coil 42 is disposed so as to face the movable plate 21 on the bottom face 311 of the concave portion 31 of the support body 3. Accordingly, a magnetic field generated by the coil 42 can be effectively applied to the permanent magnet 41. This coil 42 is electrically connected to a power source not shown in the figure, and a periodically alternating voltage (an AC voltage, an intermittent current, or the like) is applied to the coil 42 from the power source.

The movable plate 21 revolves (oscillates) as follows due to the driving unit 4.

First, for example, an AC voltage is applied to the coil 42 by the power source not shown in the figure. Accordingly, a first magnetic field in which the upper side (the movable plate 21 side) of the coil 42 is the north pole, and the lower side thereof is the south pole and a second magnetic field in which the upper side of the coil 42 is the south pole, and the lower side thereof is the north pole are generated alternately and periodically.

In the first electric field, the movable plate 21 revolves (twists) around the axial line X counterclockwise in FIG. 2 such that the north pole side of the permanent magnet 41 is attracted to the coil 42, and the south pole side is drawn apart from the coil 42 (first state). In contrast, in the second electric field, the movable plate 21 revolves (twists) around the axial line X clockwise in FIG. 2 such that the south pole side of the permanent magnet 41 is attracted to the coil 42, and the north pole side is drawn apart from the coil 42 (second state). By alternately repeating the first state and the second state, the movable plate 21 revolves around the axial line X.

Method of Manufacturing Actuator

The above-described optical scanner 1 can be manufactured, for example, as follows. Hereinafter, as an example of the method of manufacturing an actuator according to an embodiment of the invention, a method of manufacturing the optical scanner 1 will be described with reference to FIGS. 6A to 10D. FIGS. 6A to 8G show cross-sections corresponding to FIG. 2, and FIGS. 9A to 10D show cross-sections corresponding to FIG. 5.

The method of manufacturing the optical scanner 1 includes a process of forming the base body 2.

The process of forming the base body 2 includes: [A] a process of forming the concave portion 218; and [B] a process of forming the movable plate 21, the support portion 22, and one pair of the connection portions 23 and 24.

Hereinafter, the processes will be sequentially described in detail.

[A] Process of Forming Concave Portion 218

A1

Figure 6A:
FIGS. 6A to 6G are cross-sectional views illustrating a method of manufacturing the optical scanner shown in FIG. 1.

First, as shown in FIG. 6A, a silicon substrate 102 is prepared.

This silicon substrate 102 is formed as a base body 2 through etching to be described later.

More specifically, the principal face of the silicon substrate 102 is configured by a plane (100) of silicon.

A2

Figure 6B:
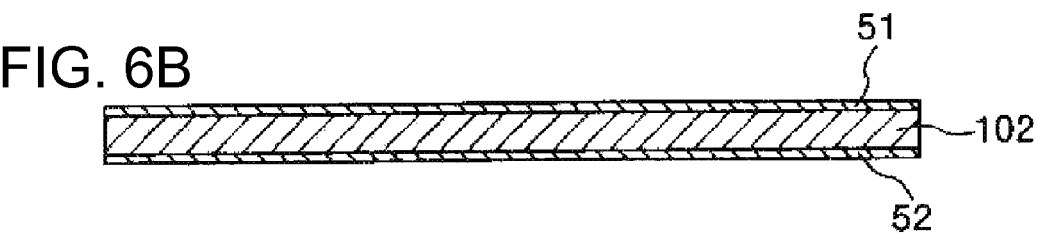

Next, as shown in FIG. 6B, a nitride film 51 is formed on the upper face of the silicon substrate 102, and a nitride film 52 is formed on the lower face of the silicon substrate 102.

These nitride films 51 and 52 are, for example, composed of SiN.

Here, the method of forming the nitride films 51 and 52 is not particularly limited. Thus, as the above-described method, for example, a vapor-phase deposition method such as a plasma CVD method may be used.

In addition, the thickness of the nitride films 51 and 52 is not particularly limited and is at a level that is equal to or larger than 0.01 μm and equal to or smaller than 0.2 μm.

Furthermore, instead of the nitride films 51 and 52, oxide films composed from SiO may be formed, for example, by using a thermal oxidation method.

A3

Figure 6C:
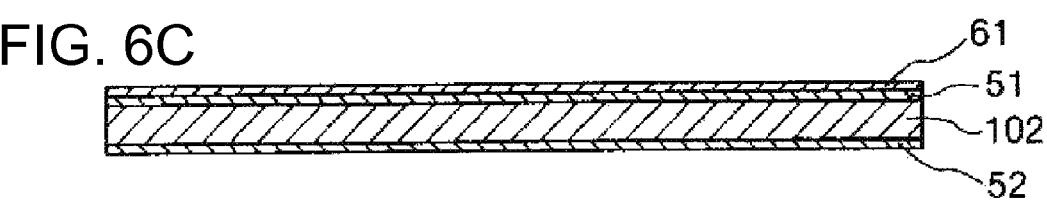
Figure 6D:
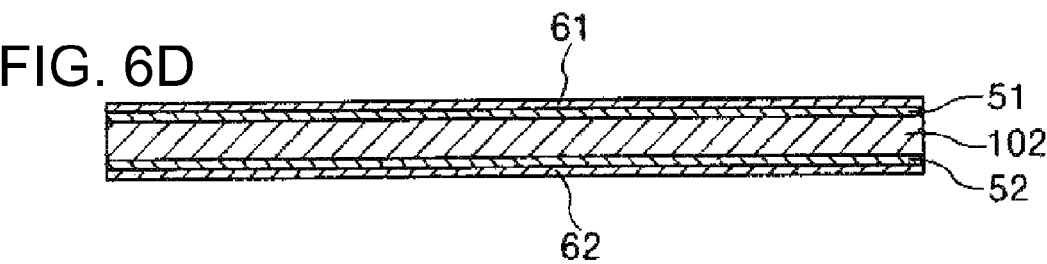

Next, as shown in FIG. 6C, a resist film 61 is formed on the nitride film 51, and as shown in FIG. 6D, a resist film 62 is formed on the nitride film 52.

These resist films 61 and 62 are configured by resist materials of a positive type or a negative type.

A4

Figure 6E:
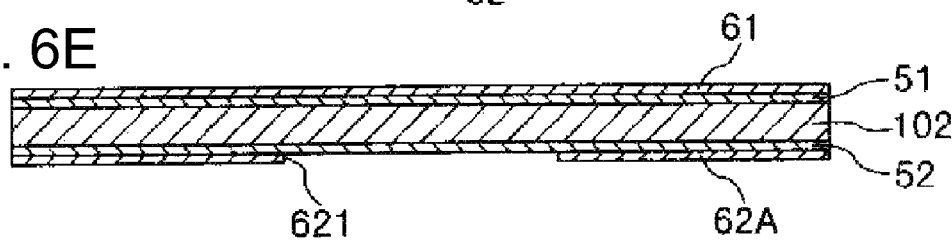

Next, by exposing and developing the resist film 62, a portion of the resist film 62 that corresponds to an area in which the concave portion 218 is to be formed is removed. Accordingly, as shown in FIG. 6E, a resist film 62A that has an opening 621 is acquired.

A5

Figure 6F:
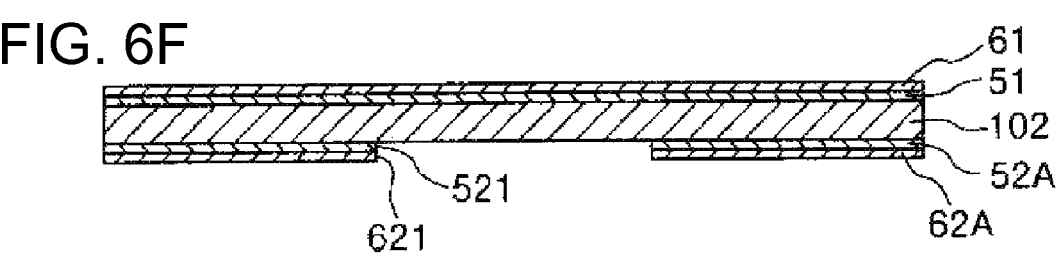

Next, apart of the nitride film 52 is removed through etching by using the resist film 62A as a mask. Accordingly, as shown in FIG. 6F, a nitride film 52A that has an opening 521 is acquired.

The above-described etching (the method of forming the opening 521) is not particularly limited. For example, reactive ion etching (RIE) or a dry etching using $CF_4$ may be used.

A6

Figure 6G:
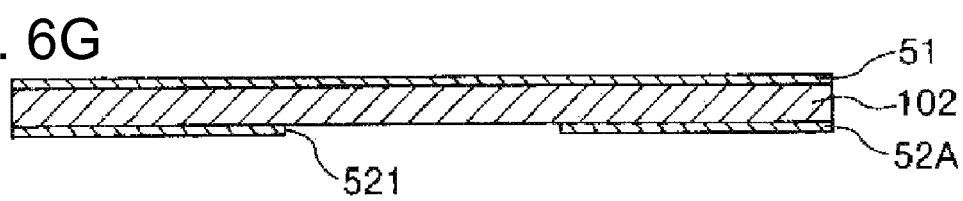

Next, the resist films 61 and 62A are removed. Accordingly, as shown in FIG. 6G, the silicon substrate 102 is in a state in which the upper face is covered with the nitride film 51, and the lower face is covered with the nitride film 52A.

A method of removing the resist films 61 and 62 is not particularly limited. Thus, for example, cleaning using sulfuric acid, $O_2$ ashing, or the like may be used.

Figure 7A:
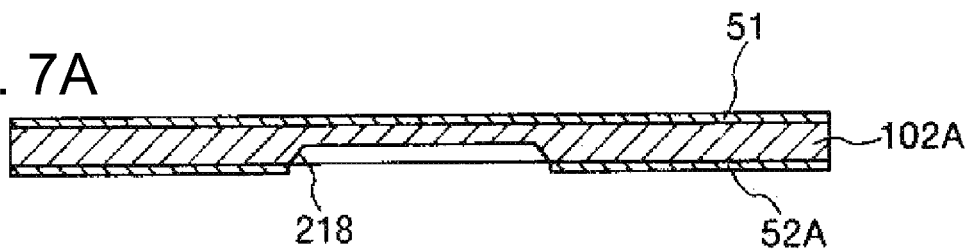
FIGS. 7A to 7G are cross-sectional views illustrating a method of manufacturing the optical scanner shown in FIG. 1.

Next, the silicon substrate 102 is etched by using the nitride film 52A as a mask. Accordingly, as shown in FIG. 7A, a silicon substrate 102A having the concave portion 218 is acquired.

The above-described etching (a method of forming the concave portion 218) is not particularly limited. Similarly to etching that is performed for forming the movable plate 21, the support portion 22, and the like to be described later, anisotropic etching is appropriately used.

The anisotropic etching is not particularly limited. Thus, for example, wet etching using a KOH aqueous solution or the like may be performed.

A8

Figure 7B:
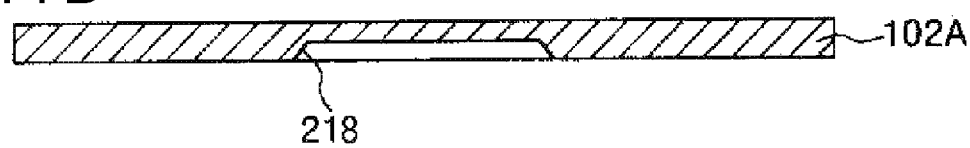

Next, the nitride films 51 and 52A are removed. Accordingly, as shown in FIG. 7B, a state is formed in which the upper face and the lower face of the silicon substrate 102A are exposed.

A method of removing the nitride films 51 and 52A is not particularly limited. Thus, similarly to the process A5, for example, reactive ion etching (RIE) or dry etching using $CF_4$, or the like may be used.

[B] Process of Forming Movable Plate 21, Support Portion 22, and the Like

B1

Figure 7C:
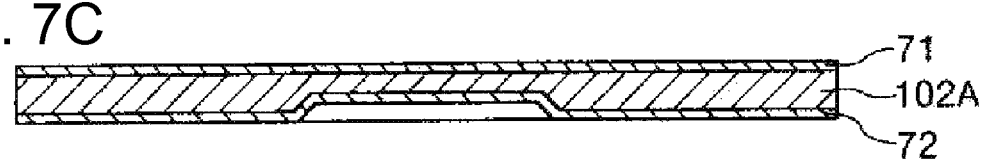

Next, as shown in FIG. 7C, a nitride film 71 is formed on the upper face of the silicon substrate 102A, and a nitride film 72 is formed on the lower face of the silicon substrate 102A.

These nitride films 71 and 72, for example, are composed of SiN.

Here, the method of forming the nitride films 71 and 72 is not particularly limited. Thus, similarly to the above-described process A2, for example, a vapor-phase deposition method such as a plasma CVD method may be used.

In addition, the thickness of the nitride films 71 and 72 is not particularly limited and is at a level that is equal to or larger than 0.01 μm and equal to or smaller than 0.3 μm.

Furthermore, instead of the nitride films 71 and 72, oxide films composed from SiO may be formed, for example, by using a thermal oxidation method.

B2

Figure 7D:
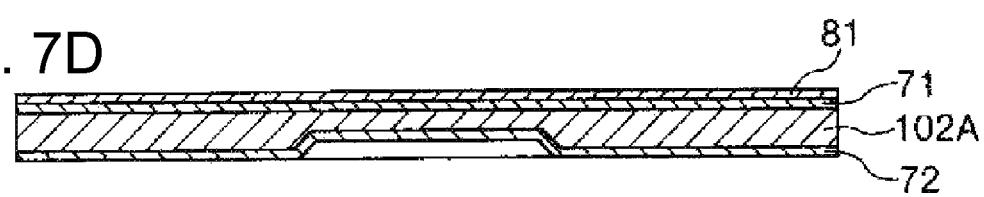

Next, as shown in FIG. 7D, a resist film 81 is formed on the nitride film 71.

This resist film 81 is configured by a resist material of a positive type or a negative type.

B3

Figure 7E:
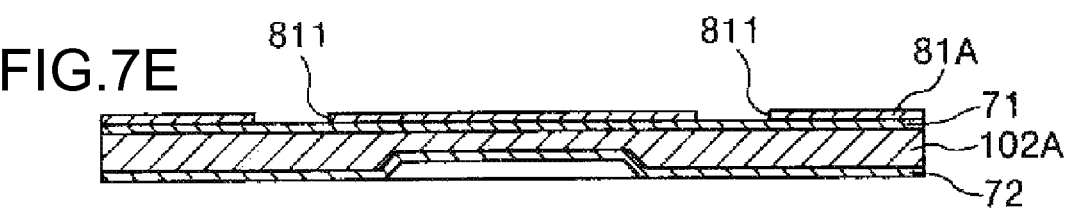

Next, by exposing and developing the resist film 81, a part of the resist film 81 is removed such that portions of the resist film 81 that correspond to areas, in which the movable plate 21, the support portion 22, and one pair of the connection portions 23 and 24 are formed, remain. Accordingly, as shown in FIG. 7E, a resist film 81A that has an opening 811 is acquired. Although not shown in FIG. 7E, in the resist film 81A, an opening formed in accordance with a gap between upper ends of one pair of the beam members 231 and 232 is formed as well.

B4

Figure 7F:
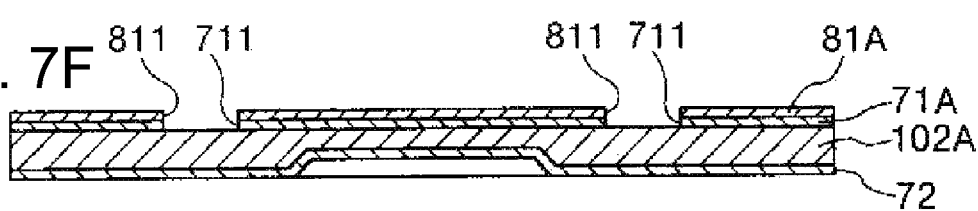

Next, apart of the nitride film 71 is removed through etching by using the resist film 81A as a mask. Accordingly, as shown in FIG. 7F, a nitride film 71A that has an opening 711 is acquired. Although not shown in FIG. 7F, in the nitride film 71A, an opening formed in accordance with a gap between upper ends of one pair of the beam members 231 and 232 is formed as well.

The above-described etching (a method of forming the opening 711) is not particularly limited. Similarly to the above-described process A5, for example, reactive ion etching (RIE) or a dry etching using $CF_4$ may be used.

B5

Figure 7G:
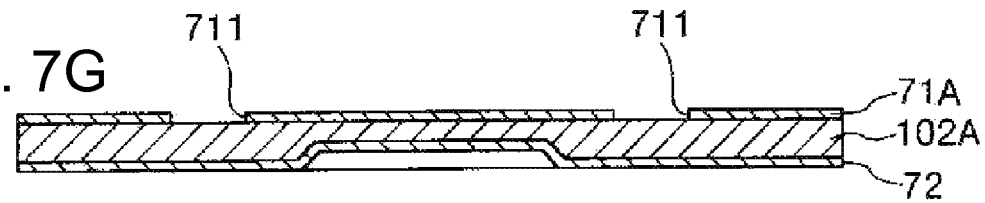

Next, the resist film 81A is removed. Accordingly, as shown in FIG. 7G, the silicon substrate 102A is in a state in which the upper face is covered with the nitride film 71A, and the lower face is covered with the nitride film 72.

A method of removing the resist film 81A is not particularly limited. Thus, for example, cleaning using sulfuric acid, $O_2$ ashing, or the like may be used.

B6

Figure 8A:
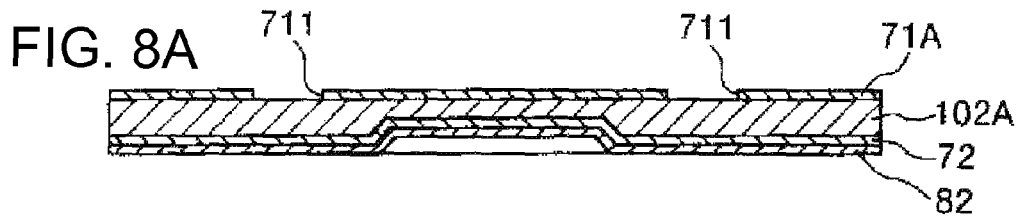
FIGS. 8A to 8G are cross-sectional views illustrating a method of manufacturing the optical scanner shown in FIG. 1.

Next, as shown in FIG. 8A, a resist film 82 is formed on the nitride film 72.

This resist film 82 is configured by a resist material of a positive type or a negative type.

B7

Figure 8B:
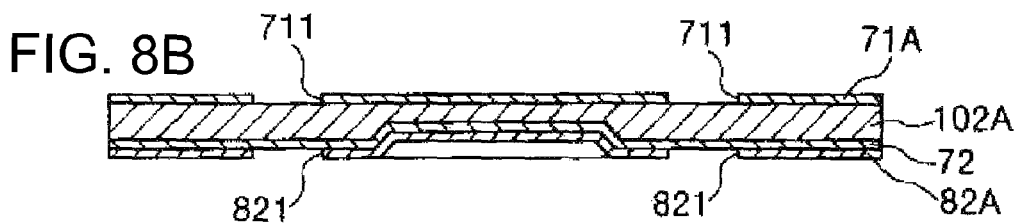

Next, by exposing and developing the resist film 82, a part of the resist film 82 is removed such that portions of the resist film 82 that correspond to areas, in which the movable plate 21, the support portion 22, and one pair of the connection portions 23 and 24 are formed, remain. Accordingly, as shown in FIG. 8B, a resist film 82A that has an opening 821 is acquired. Although not shown in FIG. 8B, in the resist film 82A, an opening formed in accordance with a gap between lower ends of one pair of the beam members 231 and 232 is formed as well.

B8

Figure 8C:
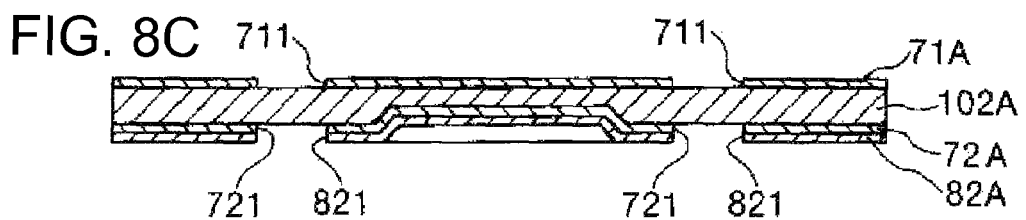

Next, a part of the nitride film 72 is removed through etching by using the resist film 82A as a mask. Accordingly, as shown in FIG. 8C, a nitride film 72A that has an opening 721 is acquired. Although not shown in FIG. 8C, in the nitride film 72A, an opening formed in accordance with a gap between the lower ends of one pair of the beam members 231 and 232 is formed as well.

The above-described etching (a method of forming the opening 721) is not particularly limited. Similarly to the above-described process A5, for example, reactive ion etching (RIE) or a dry etching using $CF_4$ may be used.

B9

Figure 8D:
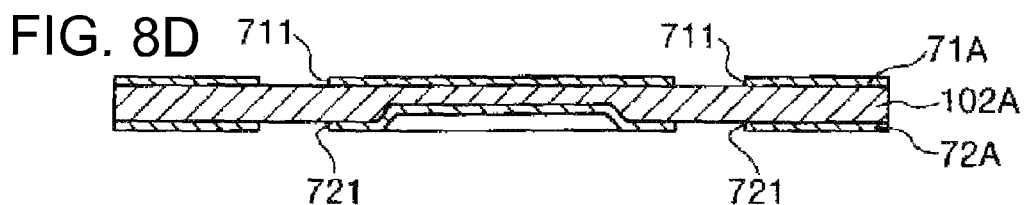

Next, the resist film 82A is removed. Accordingly, as shown in FIG. 8D, the silicon substrate 102A is in a state in which the upper face is covered with the nitride film 71A, and the lower face is covered with the nitride film 72A.

A method of removing the resist film 82A is not particularly limited. Thus, for example, cleaning using sulfuric acid, O₂ ashing, or the like may be used.

B10

Figure 8E:
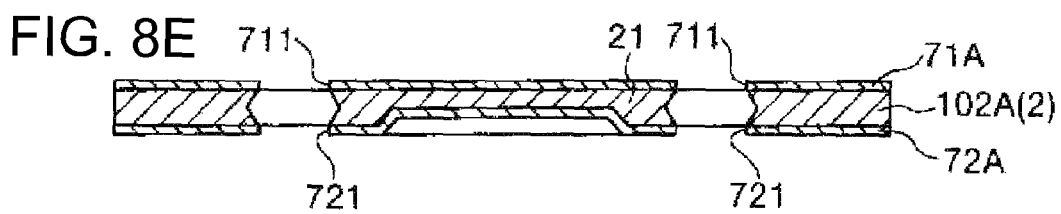

Next, anisotropic etching is performed for the silicon substrate 102A by using the nitride films 71A and 72A as masks. Accordingly, as shown in FIG. 8E, a base body 2 is acquired. In other words, in the anisotropic etching in this process, by performing anisotropic etching of the silicon substrate 102A through the nitride film 72A as a first mask and the nitride film 71A as a second mask from both face sides thereof, the movable plate 21, the support portion 22, and one pair of the connection portions 23 and 24 are formed.

The anisotropic etching (a method of forming the base body 2) is not particularly limited. Thus, for example, wet etching using a KOH aqueous solution or the like may be performed.

Here, the formation of the connection portion 23 through the anisotropic etching will be described in detail. Since the formation of the connection portion 24 is similar to that of the connection portion 23, and the description thereof will be omitted.

As shown in FIGS. 9A to 9D, the nitride film 71A used as the mask (second mask) includes a portion 712 of the connection portion 23 that is formed in correspondence with an area in which the upper face of the beam member 231 is formed and a portion 713 of the connection portion 23 that is formed in correspondence with an area in which the upper face of the beam member 232 is formed. In addition, an opening 714 (second opening) is formed between the portion 712 and the portion 713. This opening 714 is formed in correspondence with a gap between upper ends of one pair of the beam members 231 and 232.

In addition, the nitride film 72A used as the mask (first mask) includes a portion 722 of the connection portion 23 that is formed in correspondence with an area in which the lower face of the beam member 231 is formed and a portion 723 of the connection portion 23 that is formed in correspondence with an area in which the lower face of the beam member 232 is formed. In addition, an opening 724 (first opening) is formed between the portion 722 and the portion 723. This opening 724 is formed in correspondence with a gap between lower ends of one pair of the beam members 231 and 232.

Here, when the width of the opening 724 is $W_{m1}$, and the thickness of the silicon substrate 102A is T, the relation of the following Expression (3) is satisfied.

$$w_{m1} < \frac{T}{\tan 54.73°} \quad (3)$$

By satisfying this relation, even in a case where the positional relationship between the nitride film 72A as the first mask and the nitride film 71A as the second mask is misaligned, there is a level difference in one pair of side faces of the beam members 231 and 232 configured by the planes (111) of silicon, and a level difference formed on one side face and a level difference formed on the other face can be shifted in the thickness direction of the silicon substrate. Accordingly, in the acquired actuator, the concentration of stress that occurs in the beam members 231 and 232 at the time of revolving the movable plate 21 can be alleviated.

When the width of the opening 714 is $W_{m2}$, the following Expression (4) is satisfied.

$$T < \frac{\tan 54.73°}{2}(w_{m1} + w_{m2}) \quad (4)$$

Accordingly, by performing anisotropic etching of the silicon substrate 102A of which the plate face is configured by the plane (100) of silicon from both face sides thereof, the connection portion 23 that is configured by one pair of the beam members 231 and 232 can be reliably formed in a simple manner.

Hereinafter, the generation of a level difference in the anisotropic etching of this process will be described in detail.

When the anisotropic etching is performed in this process, in a case where the formation positions of the nitride films 71A and 72A used as masks are not misaligned, as shown in FIGS. 9A to 9D, the upper face of the silicon substrate 102A is etched through the openings 711 and 714, and the lower face of the silicon substrate 102A is etched through the openings 721 and 724, whereby one pair of the beam members 231 and 232 are formed.

Figure 9A:
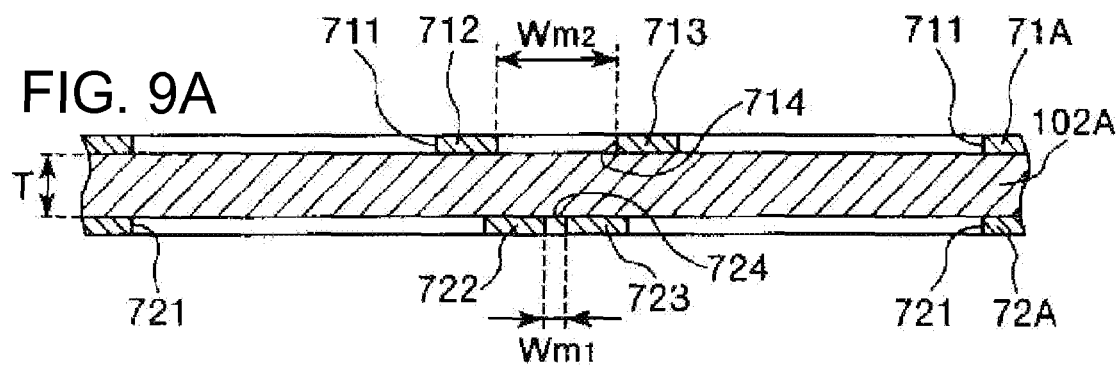
FIGS. 9A to 9D are diagrams illustrating the formation of a connection portion in an etching process shown in FIG. 8E (in a case where there is no mask misalignment).
Figure 9B:
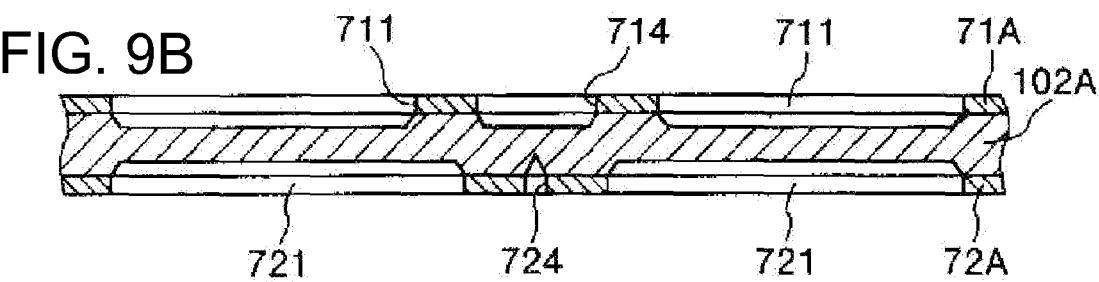
Figure 9C:
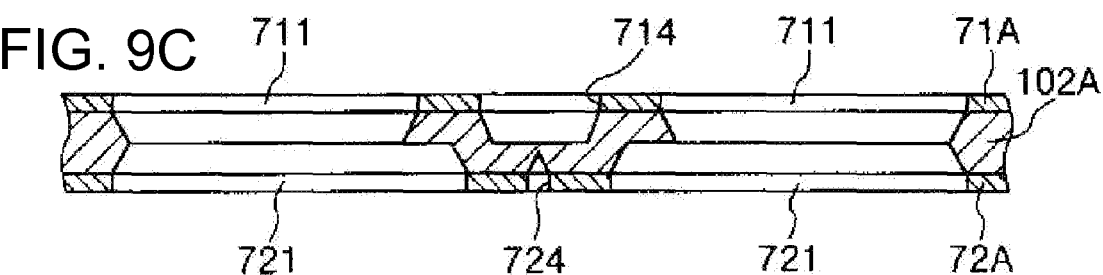
Figure 9D:
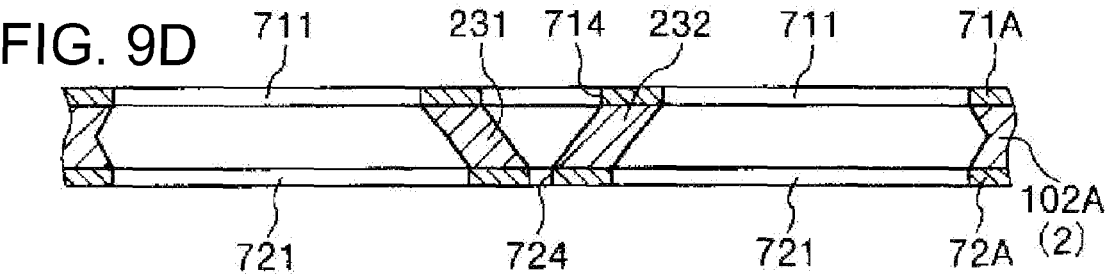

In such a case, the center positions of the openings 714 and 724 in the widthwise direction match each other in the widthwise direction. Accordingly, as shown in FIG. 9D, the side faces of the beam members 231 and 232 are fixed inclined faces that have no level difference and are configured by the planes (111) of silicon.

On the other hand, in a case where the formation positions of the nitride films 71A and 72A used as masks are misaligned, as shown in FIGS. 10A to 10D, the upper face of the silicon substrate 102A is etched through the openings 711 and 714, and the lower face of the silicon substrate 102A is etched through the openings 721 and 724, whereby one pair of the beam members 231 and 232 are formed.

Figure 10A:
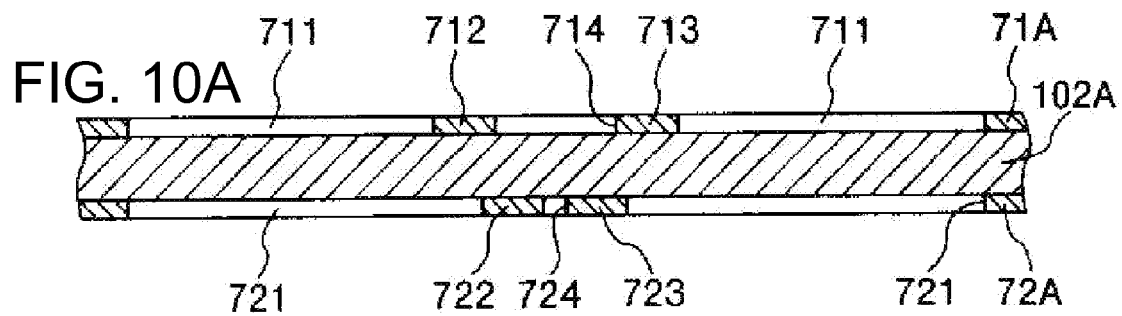
FIGS. 10A to 10D are diagrams illustrating the formation of a connection portion in an etching process shown in FIG. 8E (in a case where there is mask misalignment).
Figure 10B:
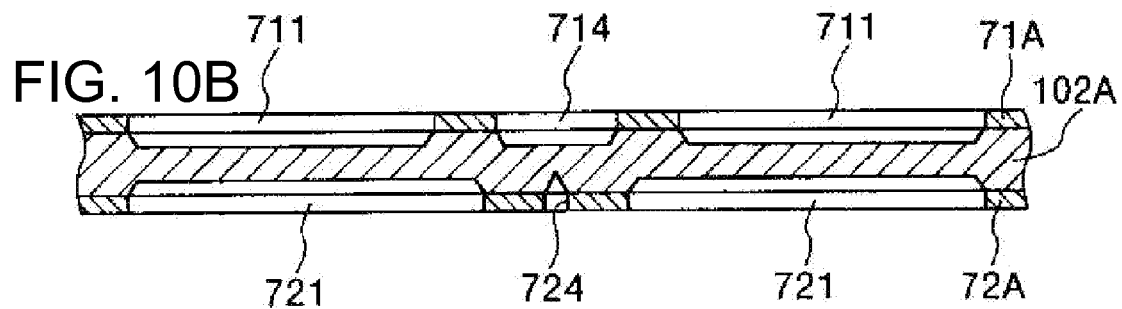
Figure 10C:
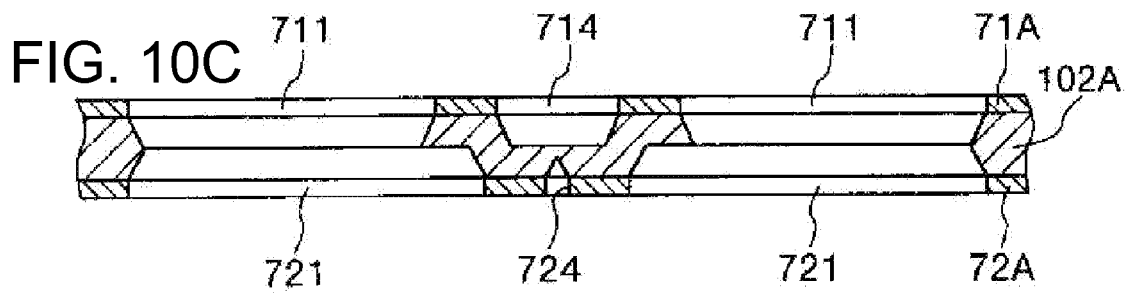
Figure 10D:
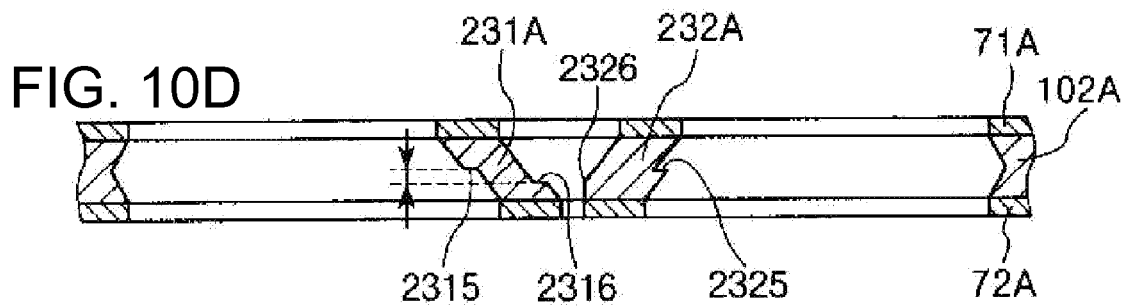

In such a case, the center positions of the openings 714 and 724 in the widthwise direction are different from each other in the widthwise direction. Accordingly, as shown in FIG. 10D, a level difference 2315 is formed on one side face of the beam member 231, and a level difference 2316 is formed on the other side face of the beam member 231. In addition, similarly, a level difference 2325 is formed on one side face of the beam member 232, and a level difference 2326 is formed on the other side face of the beam member 232.

Since the width of the opening 724 of the nitride film 72A used as a mask is formed so as to satisfy Expression (3) described above, the level difference 2316 is formed on the nitride film 72A side (the lower side) from the center of the silicon substrate 102A in the thickness direction.

In contrast to this, since the widths of the opening 711 of the nitride film 71A and the opening 721 of the nitride film 72A are excessively larger than the thickness of the silicon substrate 102A, the level difference 2315 is formed on the center of the silicon substrate 102A in the thickness direction.

Accordingly, the positions of the level difference 2315 and the level difference 2316 in the thickness direction of the silicon substrate 102A are different from each other. Similarly, the positions of the level difference 2325 and the level difference 2326 in the thickness direction of the silicon substrate 102A are different from each other.

As above, since the positions of the level differences 2315 and 2316 in the thickness direction of the silicon substrate 102A are different from each other, the concentration of stress on the center portion of the beam member 231 in the thickness direction at the time of revolving the movable plate 21 can be prevented or suppressed. Similarly, the concentration of stress on the center portion of the beam member 232 in the thickness direction at the time of revolving the movable plate 21 can be prevented or suppressed. As a result, the damage of the connection portion 23 due to the concentration of stress at the time of driving can be prevented. Similarly, the damage of the connection portion 24 due to the concentration of stress at the time of driving can be prevented.

In a case where the width of the opening 724 does not satisfy Expression (3) described above, all the level differences 2315, 2316, 2325, and 2326 are formed at the center positions of the silicon substrate 102A in the thickness direction. In other words, the positions of the level differences 2315, 2316, 2325, and 2326 in the thickness direction of the silicon substrate 102A are the same. Accordingly, there is a concern that damage occurs due to the concentration of stress at the time of driving.

B11

Figure 8F:
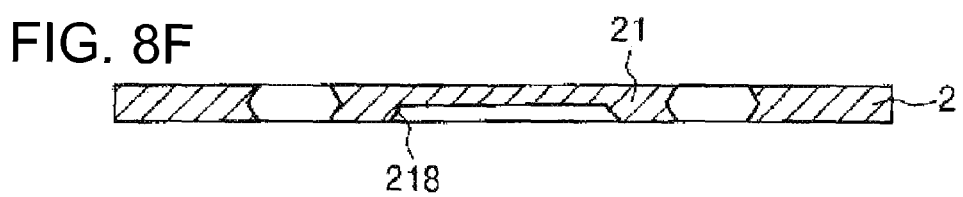

Next, the nitride films 71A and 72A are removed. Accordingly, as shown in FIG. 8F, a state is formed in which the upper face and the lower face of the base body 2 are exposed.

A method of removing the nitride films 71A and 72A is not particularly limited. Thus, similarly to the process A5, for example, reactive ion etching (RIE), dry etching using $CF_4$, a wet process using thermal phosphoric acid, or the like may be used.

In addition, a process of rounding each portion of the base body 2 is performed as desired.

Such a process (rounding process) is not particularly limited. Thus, for example, isotropic etching using hydrofluoric acid, nitric acid, and acetic (or water), a thermal process (under decompression, about 1000 to 1200° C., and under an atmosphere of Ar in which $H_2$ is introduced).

Figure 8G:
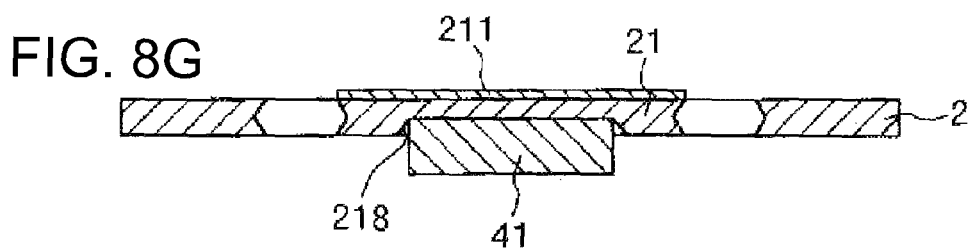

Next, as shown in FIG. 8G, the permanent magnet 41 is fixed to the lower face of the movable plate 21 through an adhesive. Alternatively, it may be configured such that a hard magnet is fixed to the lower face of the movable plate 21 through an adhesive, and thereafter a permanent magnet 41 is formed by magnetizing the hard magnet.

In addition, on the upper face of the movable plate 21, a metal film is formed, and a light reflecting portion 211 is formed. A method of forming the metal film is not particularly limited. Thus, a dry plating method such as vacuum deposition, sputtering (low-temperature sputtering), or ion plating, a wet plating method such as electrolytic plating, electroless plating, or the like, a spraying method, a metal foil bonding, or the like may be used.

In addition, although not shown in the figure, the coil 42 is disposed on the support body 3, and the support body 3 and the base body 2 are bonded together.

The optical scanner 1 can be acquired through the above-described process.

According to the above-described method of manufacturing the optical scanner 1, Expression (3) described above is satisfied. Thus, in the acquired optical scanner 1 (actuator), the concentration of stress that is generated in each one of the beam members 231, 232, 241, and 242 at the time of revolving the movable plate 21 can be alleviated.

According to the above-described optical scanner 1 (actuator) of the first embodiment, the movable plate 21 forms a cross shape in the plan view. Accordingly, while the light reflecting area of the movable plate 21 is secured, the moment of inertia at the time of revolving the movable plate 21 can be decreased.

In addition, the movable plate 21 having such a shape in the plan view can be formed with high precision in an easy manner by performing anisotropic etching of a silicon substrate.

Second Embodiment

Next, a second embodiment of the invention will be described.

Figure 11:
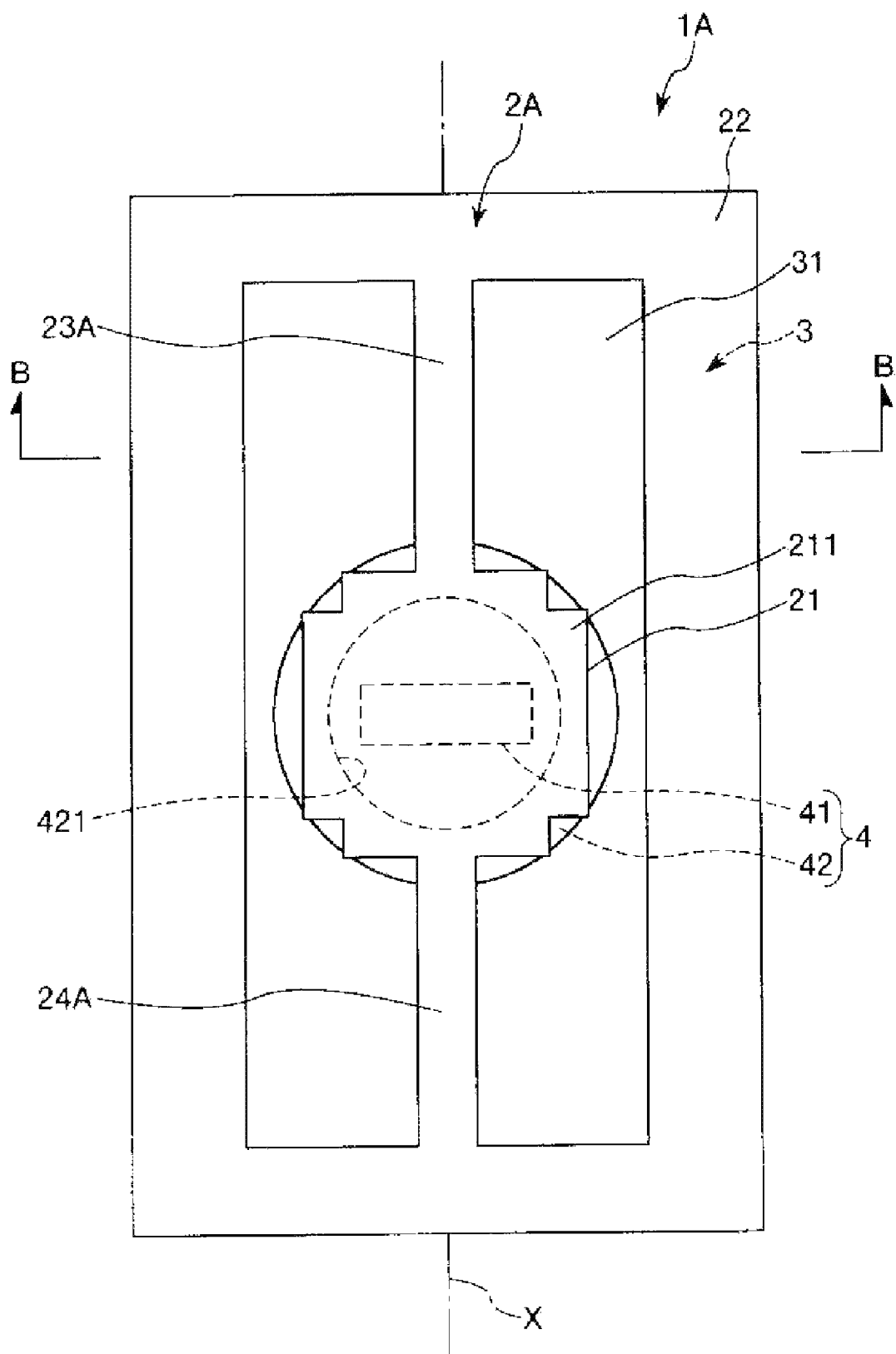
FIG. 11 is a plan view showing an optical scanner according to a second embodiment of the invention.
Figure 12:
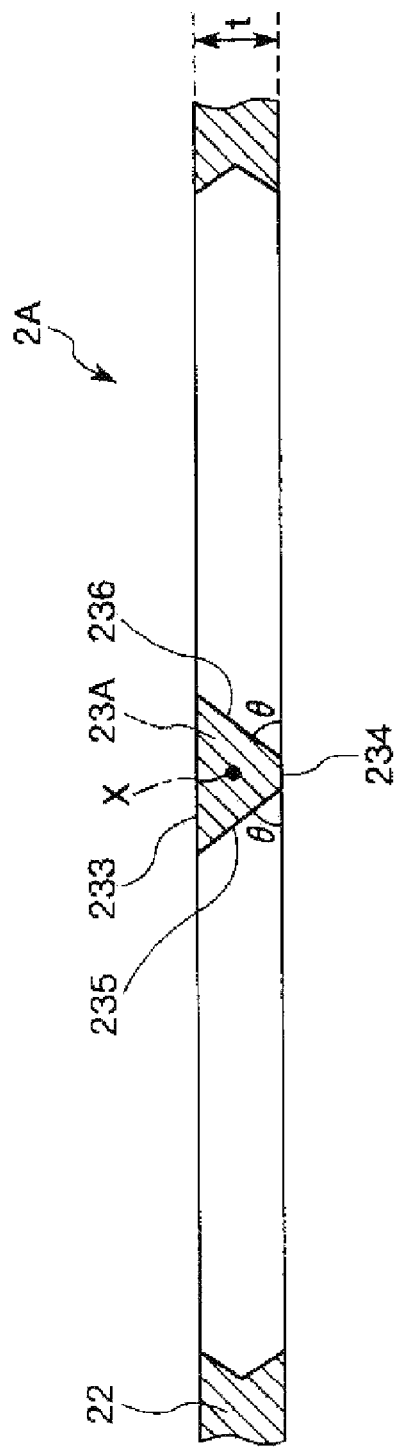
FIG. 12 is a partial enlarged cross-sectional view taken along line B-B shown in FIG. 11.

FIG. 11 is a plan view showing an optical scanner according to the second embodiment of the invention, and FIG. 12 is a partial enlarged cross-sectional view taken along line B-B shown in FIG. 11.

Hereinafter, in the optical scanner according to the second embodiment, differences from the optical scanner according to the above-described embodiment will be focused upon in the description, and the description of similar configurations will be omitted.

The optical scanner according to the second embodiment is almost the same as the optical scanner 1 according to the first embodiment except for the shape of the horizontal cross-section of a connection portion. The same reference numeral is assigned to the same configuration as that of the above-described embodiment.

The optical scanner 1A of this embodiment, as shown in FIG. 11, includes a base body 2A that has a vibration system. In addition, the base body 2A includes a movable plate 21, a support portion 22, and one pair of connection portions 23A and 24A that connect the movable plate 21 to the support portion 22 so as to revolve.

Hereinafter, the connection portion 23 will be representatively described. Since the connection portion 24 is similar to the connection portion 23, the description thereof will be omitted.

The connection portion 23A is disposed along the axial line X. In addition, the horizontal cross-sectional shape of the connection portion 23A forms a trapezoid.

More specifically, the connection portion 23A, when viewed from a direction parallel to the axial line X (in other words, viewed at the cross-section shown in FIG. 12), has a shape symmetrical (horizontally symmetrical in FIG. 12) to a segment that vertically extends and passes through the axial line X.

In addition, in the cross-section shown in FIG. 12, the entire width of the connection portion 23A is increased from the lower side toward the upper side.

In addition, the external shape of the horizontal cross-section of the connection portion 23A forms a trapezoid that is configured by one pair or sides extending along the plane (100) of silicon and one pair of sides extending along the plane (111) of silicon. In other words, in the connection portion 23A, the upper face 233 and the lower face 234 are configured by the planes (100) of silicon, and one pair of side faces 235 and 236 are configured by the planes (111) of silicon. Here, the side faces 235 and 236 have a tilt angle θ of 54.73° with respect to the upper face 233 or the lower face 234. The connection portion 23A that forms such a horizontal cross-section shape, similarly to the connection portion 23 of the above-described first embodiment, can be formed with high precision in a simple manner by performing anisotropic etching of a silicon substrate of which the plate face is configured by the plane (100) of silicon.

According to the above-described optical scanner 1A of the second embodiment, while the light reflecting area is secured, the moment of inertia at the time of revolving the movable plate is decreased, and a superior dimensional precision of the movable plate can be achieved in a simple manner.

Third Embodiment

Next, a third embodiment of the invention will be described.

Figure 13:
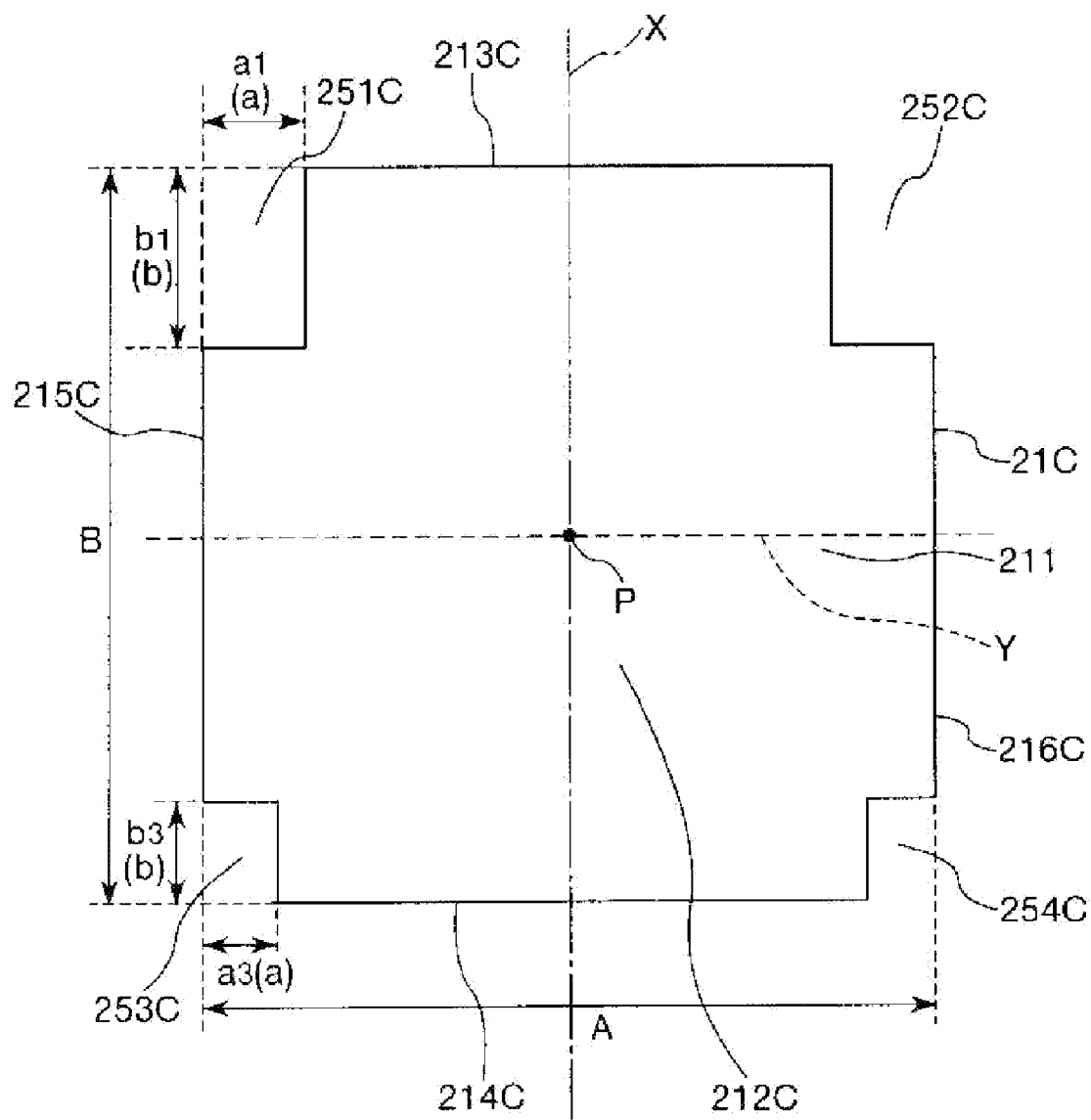
FIG. 13 is a plan view illustrating a movable plate that is included in an optical scanner according to a third embodiment of the invention.

FIG. 13 is a plan view illustrating a movable plate that is included in a scanner according to the third embodiment of the invention.

Hereinafter, in the optical scanner according to the third embodiment, differences from the optical scanner according to the above-described embodiment will be focused upon in the description, and the description of similar configurations will be omitted.

The optical scanner according to the third embodiment is almost the same as the optical scanner 1 according to the first embodiment except for the shape of a movable plate in the plan view. The same reference numeral is assigned to the same configuration as that of the above-described embodiment.

The movable plate 21C that is included in the optical scanner of this embodiment, as shown in FIG. 13, includes: a main body portion 212C; one pair of protrusions 213C and 214C that protrude from the main body portion 212C to both sides in the axial line X direction; and one pair of protrusions 215C and 216C that protrude from the main body portion 212 to both sides in the segment Y direction. Accordingly, the movable plate 21C forms a cross shape in the plan view.

In addition, between the protrusion 213C and the protrusion 215C in a direction extending along the outer periphery of the movable plate 21C, a deficient portion 251C is formed. Between the protrusion 213C and the protrusion 216C in the direction extending along the outer periphery of the movable plate 21C, a deficient portion 252C is formed. In addition, between the protrusion 214C and the protrusion 216C in the direction extending along the outer periphery of the movable plate 21C, a deficient portion 254C is formed. Between the protrusion 214C and the protrusion 215C in the direction extending along the outer periphery of the movable plate 21C, a deficient portion 253C is formed.

In this embodiment, the movable plate 21C is formed so as to be symmetrical with respect to the axial line X in the plan view from the plate thickness direction and be asymmetrical with respect to the segment Y in the plan view. Hereinafter, the deficient portions 251C and 253C will be representatively described. However, the same applies to the deficient portions 252C and 254C.

More specifically, when the length of the deficient portion 251 along the segment Y direction is a1, and the length of the deficient portion 251C along the axial line X is b1, the relation of a1<b1 is satisfied. In other words, the deficient portion 251C forms a rectangle in which the length along the axial line X direction is longer than the length along the segment Y direction. Accordingly, the mass of the end portion of the movable plate 21C that is located far from the axial line X can be efficiently reduced. Therefore, the moment of inertia of the movable plate 21C at the time of revolving can be efficiently suppressed.

Similarly, when the length of the deficient portion 253C along the segment Y direction is a3, and the length of the deficient portion 253C along the axial line X direction is b3, the relation of a3<b3 is satisfied. In other words, the deficient portion 253C forms a rectangle in which the length along the axial line X direction is longer than the length along the segment Y direction. Accordingly, the mass of the end portion of the movable plate 21C that is located far from the axial line X can be efficiently reduced. Therefore, the moment of inertia of the movable plate 21C at the time of revolving can be efficiently suppressed.

In addition, the relations of a1>a3 and b1>b3 are satisfied. Accordingly, in a case where light is incident to the light reflecting portion 211 with tilted with respect to the axial line X direction, the light reflecting area can be efficiently secured.

In addition, in this movable plate 21C, when the length of the movable plate 21C in the segment Y direction in the plan view is A, the length of the movable plate 21C in the axial line X direction is B, the length of each one of the deficient portions 251C to 254C in the segment Y direction is a, and the length of each one of the deficient portions 251C to 254C in the axial line X direction is b, Expressions (A) and (B) described above are satisfied.

According to the above-described optical scanner of the third embodiment, while the light reflecting area is secured, the moment of inertia at the time of revolving the movable plate is decreased, and a superior dimensional precision of the movable plate can be achieved in a simple manner.

Fourth Embodiment

Next, a fourth embodiment of the invention will be described.

Figure 14:
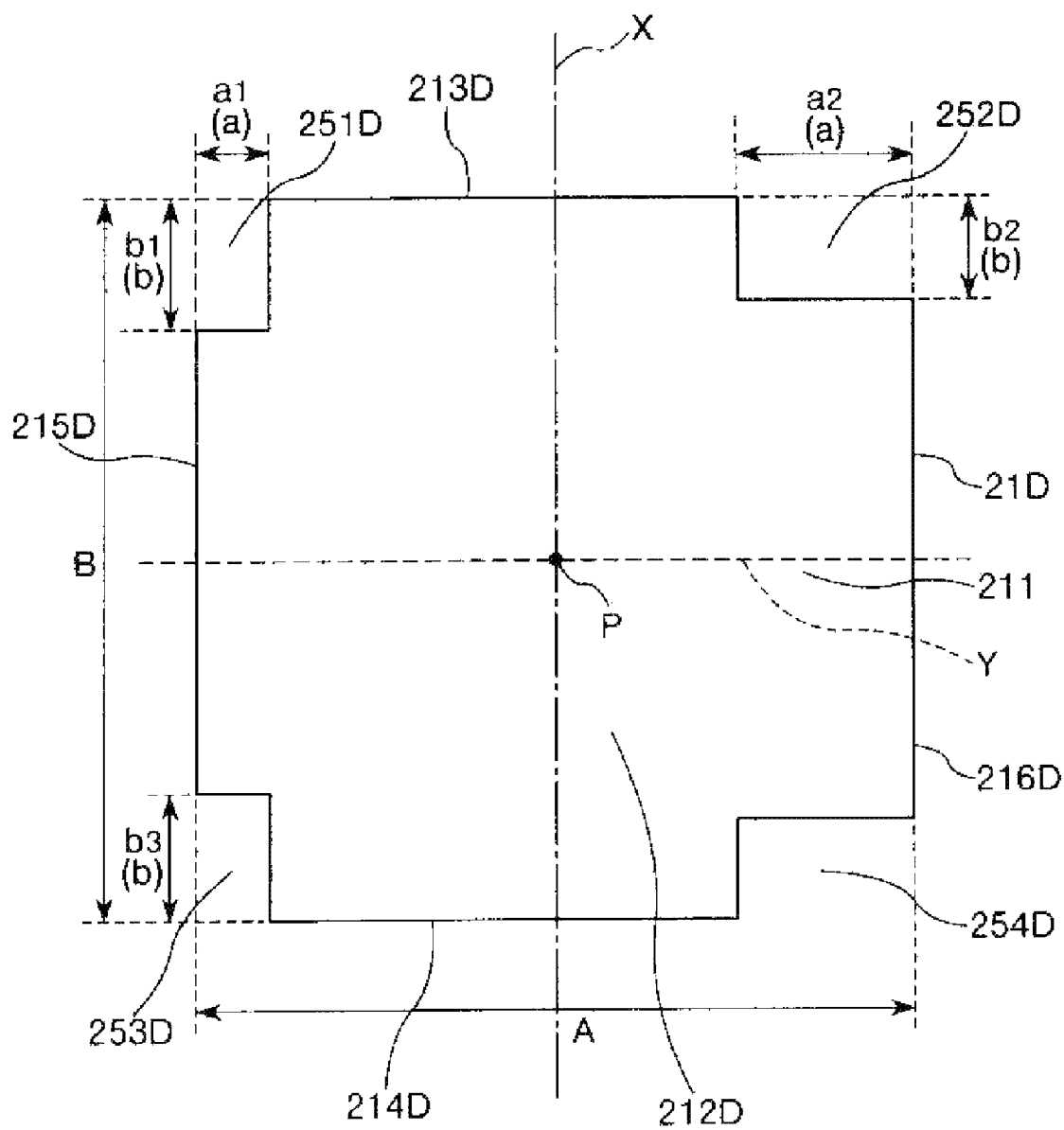
FIG. 14 is a plan view illustrating a movable plate that is included in an optical scanner according to a fourth embodiment of the invention.

FIG. 14 is a plan view illustrating a movable plate that is included in a scanner according to the fourth embodiment of the invention.

Hereinafter, in the optical scanner according to the fourth embodiment, differences from the optical scanner according to the above-described embodiment will be focused upon in the description, and the description of similar configurations will be omitted.

The optical scanner according to the fourth embodiment is almost the same as the optical scanner 1 according to the first embodiment except for the shape of a movable plate in the plan view. The same reference numeral is assigned to the same configuration as that of the above-described embodiment.

The movable plate 21D that is included in the optical scanner of this embodiment, as shown in FIG. 14, includes: a main body portion 212D; one pair of protrusions 213D and 214D that protrude from the main body portion 212D to both sides in the axial line X direction; and one pair of protrusions 215D and 216D that protrude from the main body portion 212 to both sides in the segment Y direction. Accordingly, the movable plate 21D forms a cross shape in the plan view.

In addition, between the protrusion 213D and the protrusion 215D in a direction extending along the outer periphery of the movable plate 21D, a deficient portion 251D is formed. Between the protrusion 213D and the protrusion 216D in the direction extending along the outer periphery of the movable plate 21D, a deficient portion 252D is formed. In addition, between the protrusion 214D and the protrusion 216D in the direction extending along the outer periphery of the movable plate 21D, a deficient portion 254D is formed. Between the protrusion 214D and the protrusion 215D in the direction extending along the outer periphery of the movable plate 21D, a deficient portion 253D is formed.

In this embodiment, the movable plate 21D is formed so as to be asymmetrical with respect to the axial line X in the plan view and be symmetrical with respect to the segment Y in the plan view. Hereinafter, the deficient portions 251D and 252D will be representatively described. However, the same applies to the deficient portions 253D and 254D.

More specifically, when the length of the deficient portion 251D along the segment Y direction is a1, and the length of the deficient portion 251D along the axial line X is b1, the relation of a1<b1 is satisfied. In other words, the deficient portion 251D forms a rectangle in which the length along the axial line X direction is longer than the length along the segment Y direction. Accordingly, the mass of the end portion of the movable plate 21D that is located far from the axial line X can be efficiently reduced. Therefore, the moment of inertia of the movable plate 21D at the time of revolving can be efficiently suppressed.

On the other hand, when the length of the deficient portion 252D along the segment Y direction is a2, and the length of the deficient portion 252D along the axial line X direction is b2, the relation of a2>b2 is satisfied. Accordingly, in a case where the area of the deficient portion 252D in the plan view is larger than the area of the deficient portion 251D in the plan view, the center of gravity of the movable plate 21D is prevented or suppressed from being deviated from the axial line X. Therefore, the revolving of the movable plate 21D can be smooth. In addition, in this embodiment, the relation of a1×b1<a2×b2 is satisfied.

In addition, in this movable plate 21D, when the length of the movable plate 21D in the segment Y direction in the plan view is A, the length of the movable plate 21D in the axial line X direction is B, the length of each one of the deficient portions 251D to 254D in the segment Y direction is a, and the length of each one of the deficient portions 251D to 254D in the axial line X direction is b, Expressions (A) and (B) described above are satisfied.

According to the above-described optical scanner of the fourth embodiment, while the light reflecting area is secured, the moment of inertia at the time of revolving the movable plate is decreased, and a superior dimensional precision of the movable plate can be achieved in a simple manner.

The optical scanner as described above can be preferably applied to an image forming apparatus such as a projector, a laser printer, a display for imaging, a barcode reader, or a scanning-type confocal microscope. As a result, an image forming apparatus having superior drawing characteristics can be provided.

Image Forming Apparatus

Here, an example of an image forming apparatus according to an embodiment of the invention will be described with reference to FIG. 15.

Figure 15:
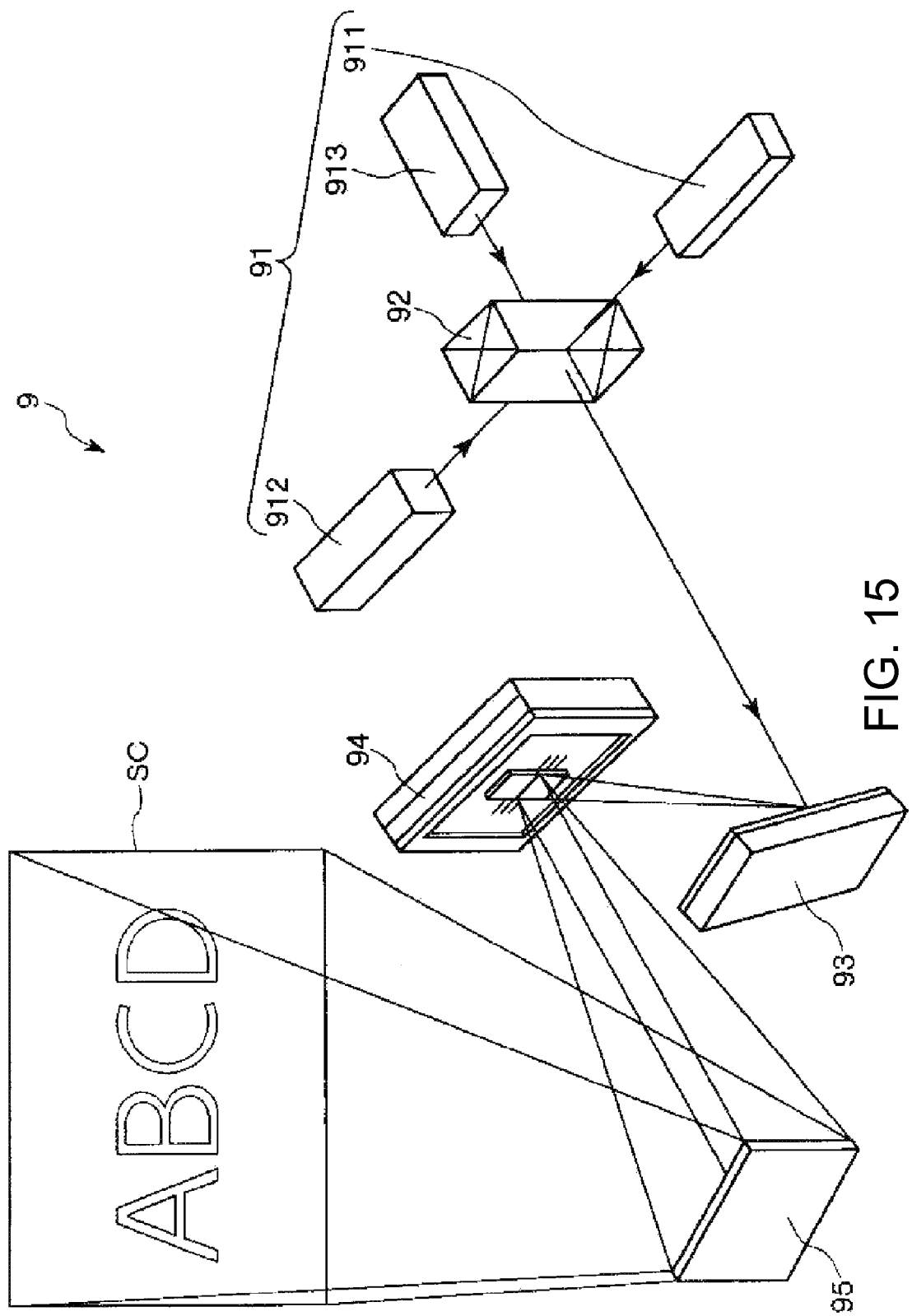
FIG. 15 is a schematic diagram showing an example of the configuration of an image forming apparatus according to an embodiment of the invention.

FIG. 15 is a schematic diagram showing an example of the configuration of the image forming apparatus according to the embodiment of the invention. Hereinafter, for convenience of the description, the longitudinal direction of the screen SC is referred to as a "horizontal direction", and a direction perpendicular to the longitudinal direction is referred to as a "vertical direction".

A projector 9 includes: a light source device 91 that emits light such as a laser beam; a cross dichroic prism 92; one pair of optical scanners 93 and 94 (for example, optical scanners having the same configuration as that of the optical scanner 1) according to an embodiment of the invention; and a fixed mirror 95.

The light source device 91 includes a red light source device 911 that emits red light, a blue light source device 912 that emits blue light, and a green light source device 913 that emits green light.

The cross dichroic prism 92 is configured by bonding four right-angle prisms and is an optical device that composes light emitted from the red light source device 911, the blue light source device 912, and the green light source device 913.

The projector 9 is configured such that light emitted from the red light source device 911, light emitted from the blue light source device 912, and light emitted from the green light source device 913 based on image information transmitted from a host computer not shown in the figure are composed by the cross dichroic prism 92, and the composed light is scanned by the optical scanners 93 and 94 and is reflected by the fixed mirror 95, whereby a color image is formed on a screen SC.

Here, optical scanning of the optical scanners 93 and 94 will be described more specifically.

First, the light composed by the cross dichroic prism 92 is scanned in the horizontal direction by the optical scanner 93 (main scanning). Then, the light scanned in the horizontal direction is further scanned in the vertical direction by optical scanner 94 (sub scanning). Accordingly, a two-dimensional color image can be formed on the screen SC. By using the optical scanners according to an embodiment of the invention as the optical scanners 93 and 94, extremely excellent drawing characteristics can be acquired.

However, the projector 9 is not limited thereto, as long as it is configured so as to form an image on a target object by scanning light by using an optical scanner. Thus, for example, the fixed mirror 95 may be omitted.

According to the projector 9 configured as above, the optical scanners 93 and 94 having the same configuration as that of the above-described optical scanner 1 are included, and therefore, a high-quality image can be acquired at low cost.

As above, the actuator, the optical scanner, and the image forming apparatus according to embodiments of the invention have been described with reference to the accompanying drawings. However, the invention is not limited thereto. For example, in the actuator, the optical scanner, and the image forming apparatus according to an embodiment of the invention, the configuration of each portion can be replaced by a portion having an arbitrary configuration that implements the same function, and an arbitrary configuration may be added thereto.

In addition, in the above-described embodiments, a case has been described in which the movable plate forms a symmetric shape with respect to at least one of the revolving center axis in the plan view and the segment vertical thereto. However, the invention is not limited thereto, and the movable plate may form a shape that is asymmetrical with respect to one of the revolving center axis in the plan view and the segment vertical thereto.

Furthermore, in the above-described embodiments, an example has been described in which the actuator according to an embodiment of the invention is applied to the optical scanner. However, the actuator according to an embodiment of the invention is not limited thereto and can be applied to other optical devices such as a light switch, or an optical attenuator.

In addition, in the above-described embodiments, an example has been described in which the driving unit revolving the movable plate has a configuration employing a moving magnet-type electronic driving system. However, such a driving unit may be a moving coil-type electronic driving system or may employ a driving system other than the electronic driving system such as an electrostatic driving system or a piezoelectric driving system.

What is claimed is:

1. An actuator comprising:
a movable portion that includes a light reflecting portion having light reflectivity and that oscillates around an oscillation axis;
a connection portion that extends from the movable portion and is torsionally deformed in accordance with oscillation of the movable portion; and
a support portion that supports the connection portion,
the movable portion and the light reflecting portion have two first protrusions that protrude to both sides of the movable portion in a direction of the oscillation axis, and have two second protrusions that protrude to both sides of the movable portion in a direction intersecting the oscillation axis in a plan view, wherein the length of the first protrusion in the direction of the oscillation axis is longer than the length of the second protrusion in the direction intersecting the oscillation axis.

2. The actuator according to claim 1, wherein an external shape of the movable portion in the plan view is mainly configured by a segment that is parallel to the oscillation axis and a segment that is perpendicular to the oscillation axis.

3. The actuator according to claim 1, wherein the movable portion, the support portion, and the connection portion are formed of an anisotropically etched silicon substrate.

4. The actuator according to claim 3, wherein a plate face of the movable portion is configured by a plane (100) of silicon.

5. The actuator according to claim 4, wherein a side face of the movable portion is mainly configured by a plane (111) of silicon.

6. The actuator according to claim 3, wherein a side face of the movable portion is mainly configured by a plane (111) of silicon.

7. The actuator according to claim 6, wherein, a groove that forms a "V" shape at a cross-section that is perpendicular to the plate face of the movable portion is formed on the side face of the movable portion.

8. The actuator according to claim 3, wherein a surface of the connection portion is configured by a plane (100) of silicon and a plane (111) of silicon.

9. The actuator according to claim 1, wherein the movable portion is symmetrical with respect to the oscillation axis of the movable portion in the plan view.

10. The actuator according to claim 1, wherein the movable portion is symmetrical with respect to a segment that passes through the center of the movable portion in the plan view and is perpendicular to the oscillation axis of the movable portion.

11. The actuator of claim 1, wherein the light reflecting portion is disposed on a first face of the movable portion and a permanent magnet of a driving unit is recessed within a second face of the movable portion.

12. An optical scanner comprising:
a movable portion that includes a light reflecting portion having light reflectivity and that oscillates around an oscillation axis;
a connection portion that extends from the movable portion and is torsionally deformed in accordance with oscillation of the movable portion; and
a support portion that supports the connection portion,
the movable portion and the light reflecting portion have two first protrusions that protrude to both sides of the movable portion in a direction of the oscillation axis, and have two second protrusions that protrude to both sides of the movable portion in a direction intersecting the oscillation axis in a plan view,
wherein the length of the first protrusion in the direction of the oscillation axis is longer than the length of the second protrusion in the direction intersecting the oscillation axis.

13. An image forming apparatus comprising:
a light source that emits light; and
an optical scanner that scans light emitted from the light source,
wherein the optical scanner includes:
a movable portion that includes a light reflecting portion having light reflectivity and that oscillates around an oscillation axis;
a connection portion that extends from the movable portion and is torsionally deformed in accordance with oscillation of the movable portion; and
a support portion that supports the connection portion,
the movable portion and the light reflecting portion have two first protrusions that protrude to both sides of the movable portion in a direction of the oscillation axis, and have two second protrusions that protrude to both sides of the movable portion in a direction intersecting the oscillation axis in a plan view,
wherein the length of the first protrusion in the direction of the oscillation axis is longer than the length of the second protrusion in the direction intersecting the oscillation axis.

14. An image forming apparatus comprising:
a light source that emits light; and
an optical scanner that scans light emitted from the light source,
wherein the optical scanner includes:
a movable portion that includes a light reflecting portion having light reflectivity and that oscillates around an oscillation axis;
a connection portion that extends from the movable portion and is torsionally deformed in accordance with oscillation of the movable portion; and
a support portion that supports the connection portion,
wherein the movable portion has a rectangular cross shape in a plan view, and the light reflecting portion forms a cross shape in a plan view, the rectangular cross shape being a rectangle with four corner portions eliminated therefrom, each corner portion having a rectangular shape,
the rectangular cross shape of the movable portion and the light reflecting portion have two first protrusions that protrude to both sides of the movable portion in a direction of the oscillation axis, and have two second protrusions that protrude to both sides of the movable portion in a direction intersecting the oscillation axis in a plan view,
wherein the length of the first protrusion in the direction of the oscillation axis is longer than the length of the second protrusion in the direction intersecting the oscillation axis.

* * * * *